United States Patent
Kaneto et al.

(10) Patent No.: US 12,534,790 B2
(45) Date of Patent: Jan. 27, 2026

(54) HOT DIP GALVANNEALED STEEL SHEET

(71) Applicant: NIPPON STEEL CORPORATION, Tokyo (JP)

(72) Inventors: Taihei Kaneto, Tokyo (JP); Takashi Oke, Tokyo (JP); Nayuta Kawazu, Tokyo (JP); Atsushi Komuro, Tokyo (JP); Tomohiro Miyashita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 50 days.

(21) Appl. No.: 18/562,665

(22) PCT Filed: Apr. 21, 2022

(86) PCT No.: PCT/JP2022/018474
§ 371 (c)(1),
(2) Date: Nov. 20, 2023

(87) PCT Pub. No.: WO2022/244592
PCT Pub. Date: Nov. 24, 2022

(65) Prior Publication Data
US 2024/0229212 A1 Jul. 11, 2024

(30) Foreign Application Priority Data
May 21, 2021 (JP) ................. 2021-086304

(51) Int. Cl.
*C22C 38/00* (2006.01)
*C21D 1/74* (2006.01)
(Continued)

(52) U.S. Cl.
CPC ................. *C23C 2/06* (2013.01); *C21D 1/74* (2013.01); *C21D 6/001* (2013.01); *C21D 6/002* (2013.01);
(Continued)

(58) Field of Classification Search
CPC ... B32B 15/013; C22C 38/001; C22C 38/002; C22C 38/004; C22C 38/005;
(Continued)

(56) References Cited

U.S. PATENT DOCUMENTS 5,049,453 A * 9/1991 Suemitsu ............. B32B 15/013
428/629
6,517,955 B1 2/2003 Takada et al.

FOREIGN PATENT DOCUMENTS

CN 1310770 A 8/2001
JP 8-209301 A 8/1996
(Continued)

OTHER PUBLICATIONS

Barlow, "Pickling Steel", American Galvanizers Association, Feb. 2, 2015, URL: <https://galvanizeit.org/knowledgebase/article/pickling-steel#:~:text=The%20rate%20of%20steel%20pickling,Note%20Pickling%20Iron%20and%20Steel.>, pp. 1-4 (Year: 2015).*

*Primary Examiner* — Katherine A Christy
(74) *Attorney, Agent, or Firm* — Birch, Stewart, Kolasch & Birch, LLP

(57) ABSTRACT

A hot dip galvannealed steel sheet comprising a base steel sheet and a plating layer. The base steel sheet has a predetermined chemical composition by mass %. An existence ratio ER of internal oxides identified under predetermined conditions by observation of a cross-section of the base steel sheet is 40 % or less and an interval I of internal oxides is 300 μm or more. The hot dip galvannealed steel sheet is excellent in appearance.

16 Claims, 3 Drawing Sheets

(51) Int. Cl.
| | |
|---|---|
| C21D 6/00 | (2006.01) |
| C21D 8/02 | (2006.01) |
| C21D 9/46 | (2006.01) |
| C22C 18/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/10 | (2006.01) |
| C22C 38/12 | (2006.01) |
| C22C 38/14 | (2006.01) |
| C22C 38/16 | (2006.01) |
| C22C 38/26 | (2006.01) |
| C22C 38/28 | (2006.01) |
| C22C 38/32 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/54 | (2006.01) |
| C22C 38/56 | (2006.01) |
| C22C 38/60 | (2006.01) |
| C23C 2/06 | (2006.01) |
| C23C 2/28 | (2006.01) |
| C23C 2/40 | (2006.01) |

(52) U.S. Cl.
CPC ............. *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 18/00* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/56* (2013.01); *C22C 38/60* (2013.01); *C23C 2/285* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ....... C22C 38/008; C22C 38/02; C22C 38/04; C22C 38/06; C22C 38/08; C22C 38/10; C22C 38/12; C22C 38/14; C22C 38/16; C22C 38/26; C22C 38/28; C22C 38/32; C22C 38/42; C22C 38/44; C22C 38/46; C22C 38/48; C22C 38/52; C22C 38/54; C22C 38/56; C22C 38/60; C21D 2211/001; C21D 2211/002; C21D 2211/005; C21D 2211/008
USPC .......................................................... 428/640
See application file for complete search history.

(56) References Cited

FOREIGN PATENT DOCUMENTS

| | | |
|---|---|---|
| JP | 2001-181787 A | 7/2001 |
| JP | 2006-291272 A | 10/2006 |
| JP | 2016-132801 A | 7/2016 |
| WO | WO 2016/170794 A1 | 10/2016 |

\* cited by examiner

FIG. 2A : STEEL SHEET BEFORE ANNEALING
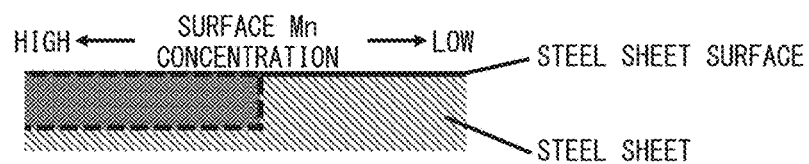
FIG. 2B : STEEL SHEET AFTER ANNEALING
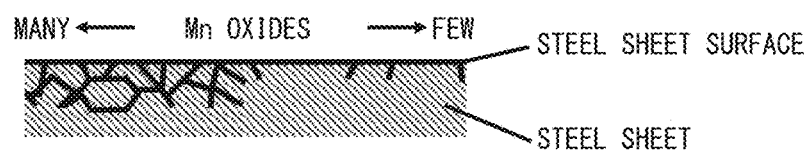
FIG. 2C : HOT DIP GALVANIZED STEEL SHEET
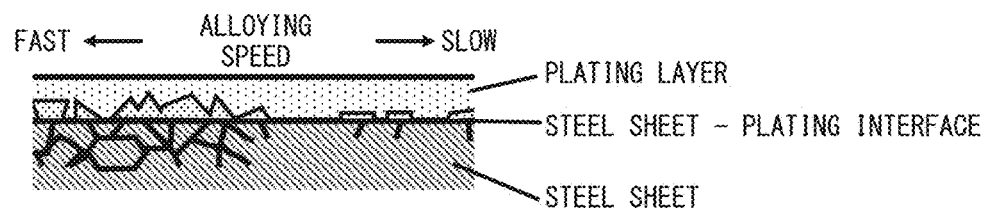
FIG. 2D : HOT DIP GALVANNEALED STEEL SHEET
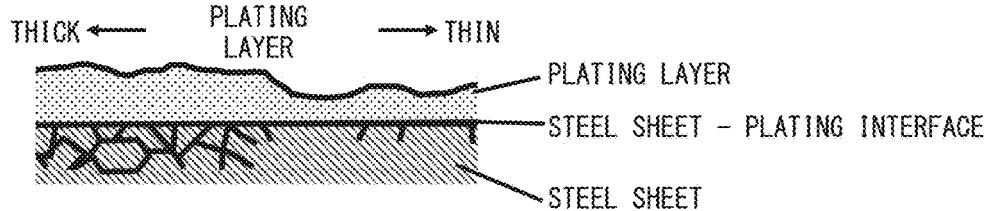

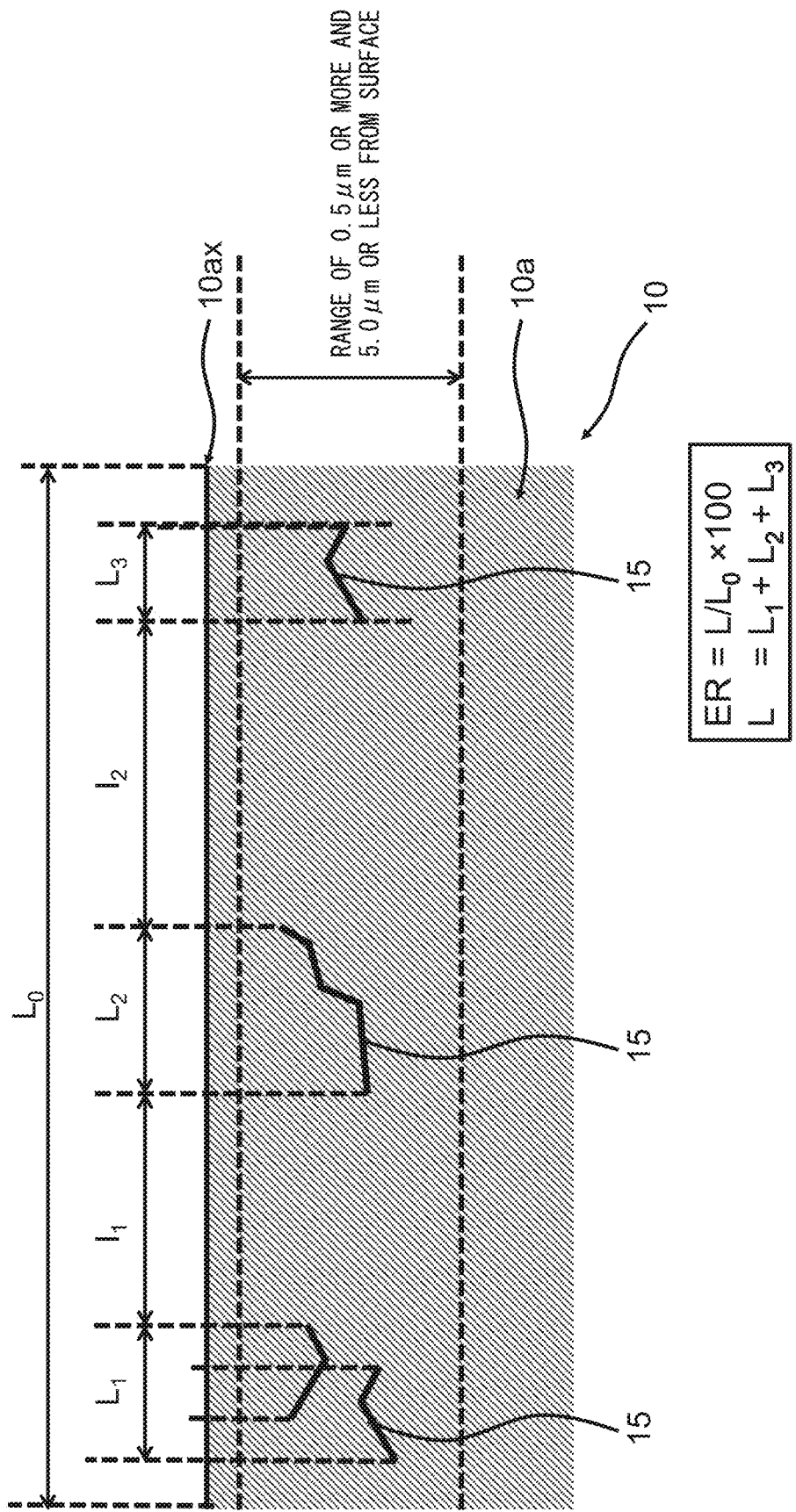

HOT DIP GALVANNEALED STEEL SHEET

TECHNICAL FIELD

The present application discloses hot dip galvannealed steel sheet.

Hot dip galvannealed steel sheet is excellent in coatability etc., so is much used for automobile body applications first and foremost and for external members of household electric appliances, building materials, and the like. On the other hand, in hot dip galvannealed steel sheet, streaking easily occurs in the plating. This streaking remains even after coating. Sometimes it is not possible to satisfy the appearance required as an external member. That is, if streaking occurs in plating and the plating appearance becomes poor, the appearance after coating will also easily become poor.

As measures against streaking of the plating layer in hot dip galvannealed steel sheet, various art has been proposed. For example, PTL 1 discloses art for optimizing the balance between the Ti and Nb contained in a base steel sheet consisting of IF steel and suppressing the amounts of addition of Mn, P, and Si to suppress the occurrence of uneven plating at the steel sheet surface. Further, PTL 2 discloses the art, in a base steel sheet consisting of IF steel, of suppressing the occurrence of streaking of plating derived from surface defects of the steel sheet by making the X-ray intensity of the {100} face in the direction parallel to the steel sheet surface a random intensity ratio of 0.8 or less and making a ratio of nonrecrystallized grains 0.10% or less. Furthermore, PTL 3 discloses art, in a base steel sheet consisting of BH steel, of suppressing the occurrence of streaking of plating by making the Mn concentration of the surface layer after annealing not more than a predetermined upper limit.

CITATIONS LIST

Patent Literature

[PTL 1] Japanese Unexamined Patent Publication No. 2006-291272
[PTL 2] Japanese Unexamined Patent Publication No. 2016-132801
[PTL 3] WO2016/170794

SUMMARY OF INVENTION

Technical Problem

As explained above, solutions for the streaking of plating of hot dip galvannealed steel sheet have been proposed from various viewpoints, but it is difficult to say that sufficient effects have been obtained. On this point, in hot dip galvannealed steel sheet, there is still room for improvement in suppressing streaking of plating and enhancing appearance.

Further, the hot dip galvannealed steel sheet used for the above applications is usually used after being press-formed. In the prior art, at the time of press-forming of hot dip galvannealed steel sheet, the nonalloyed plating parts may adhere to the die and impair the shapeability and productivity. Further, cracking may occur due to secondary work embrittlement.

Furthermore, the hot dip galvannealed steel sheet used for the above applications is preferably high in balance of strength and ductility. In the prior art, hot dip galvannealed steel sheet excellent in balance of strength and ductility has not been sufficiently studied.

Solution to Problem

As one means for solving the above technical problem, the present application discloses: a hot dip galvannealed steel sheet, having a base steel sheet and a plating layer, wherein the base steel sheet has a chemical composition containing, by mass %,
C: 0.0005 to 0.0100%,
Si: 0.01 to 0.50%,
Mn: 0.01 to 2.00%,
P: 0.100% or less,
S: 0.0100% or less,
N: 0.0200% or less,
Ti: 0.040 to 0.180%,
Nb: 0 to 0.100%,
B: 0.0005 to 0.0100%,
Al: 0 to 1.000%,
Cu: 0 to 1.000%,
Cr: 0 to 2.000%,
Ni: 0 to 0.500%,
Mo: 0 to 3.000%,
W: 0 to 0.100%,
V: 0 to 1.000%,
O: 0 to 0.020%,
Ta: 0 to 0.100%,
Co: 0 to 3.000%,
Sn: 0 to 1.000%,
Sb: 0 to 0.500%,
As: 0 to 0.050%,
Mg: 0 to 0.050%,
Zr: 0 to 0.050%,
Ca: 0 to 0.0500%,
REM: 0 to 0.0500% and
a balance of Fe and impurities, an existence ratio ER of internal oxides identified by the following Condition 1 is 40% or less,
an interval I of internal oxides identified by the following Condition 2 is 300 µm or more:
Condition 1: A cross-section of the base steel sheet vertical to the rolling direction is examined and grain boundary type internal oxides contained in the cross-section are identified. Here, the field of observation is within a range of 2 mm along the surface direction of the base steel sheet. Internal oxides present within a range of 0.5 µm or more and 5.0 µm or less in the depth direction from the surface of the base steel sheet are covered. The identified internal oxides are projected on the surface of the base steel sheet. At the surface of the base steel sheet, the ratio occupied by the internal oxides projected on the surface of the base steel sheet is identified as the "existence ratio ER" of the internal oxides.

Condition 2: A cross-section of the base steel sheet vertical to the rolling direction is examined and grain boundary type internal oxides contained in the cross-section are identified. Here, the field of observation is within a range of 2 mm along the surface direction of the base steel sheet. Internal oxides present within a range of 0.5 µm or more and 5.0 µm or less in the depth direction from the surface of the base steel sheet are covered. The identified internal oxides are projected on the surface of the base steel sheet. At the surface of the base steel sheet, the interval I of the adjacent internal oxides is identified based on the positions of the internal oxides projected on the surface of the base steel sheet.

In the hot dip galvannealed steel sheet of the present disclosure, the chemical composition may contain, by mass %,
Mn: 0.01 to 1.30% or 1.70 to 2.00%.

In the hot dip galvannealed steel sheet of the present disclosure, the existence ratio ER of the internal oxides may be 5% or more.

In the hot dip galvannealed steel sheet of the present disclosure, the chemical composition may contain by mass % at least one element selected from the group consisting of:
Nb: 0.001 to 0.100%,
Al: 0.001 to 1.000%,
Cu: 0.001 to 1.000%,
Cr: 0.001 to 2.000%,
Ni: 0.001 to 0.500%,
Mo: 0.001 to 3.000%,
W: 0.001 to 0.100%,
V: 0.001 to 1.000%,
O: 0.001 to 0.020%,
Ta: 0.001 to 0.100%,
Co: 0.001 to 3.000%,
Sn: 0.001 to 1.000%,
Sb: 0.001 to 0.500%,
As: 0.001 to 0.050%,
Mg: 0.001 to 0.050%,
Zr: 0.001 to 0.050%,
Ca: 0.0001 to 0.0500%, and
REM: 0.0001 to 0.0500%.

In the hot dip galvannealed steel sheet of the present disclosure, the microstructure of the base steel sheet may be, by area ratio:
ferrite: 94 to 100%,
martensite and bainite in total: 0 to 4%, and
retained austenite: 0 to 2%.

In the hot dip galvannealed steel sheet of the present disclosure, the chemical composition of the plating layer may contain, by mass %,
Fe: 5 to 25%,
Al: 0 to 1.0%,
Si: 0 to 1.0%,
Mg: 0 to 1.0%,
Mn: 0 to 1.0%,
Ni: 0 to 1.0%,
Sb: 0 to 1.0%, and
balance: Zn and impurities.

Effects

The hot dip galvannealed steel sheet of the present disclosure is resistant to streaking of the plating and is excellent in plating appearance and coated appearance. Further, the hot dip galvannealed steel sheet of the present disclosure is excellent in wettability of the plating to the base steel sheet, is easily suppressed in adhesion of the nonalloyed plating parts to the die at the time of press-forming, and is easily suppressed in secondary work embrittlement as well.

BRIEF DESCRIPTION OF DRAWINGS

FIG. 2 is a schematic view for explaining a mechanism by which streaking occurs in a hot dip galvannealed plating layer.

FIG. 3 is a schematic view for explaining a flow in a case of identifying an existence ratio ER and an interval I by the Conditions 1 and 2. For ease of understanding, this is shown enlarged in the sheet thickness direction. Further, the plating layer is omitted.

DESCRIPTION OF EMBODIMENTS

1. Hot Dip Galvannealed Steel Sheet

Figure 1:
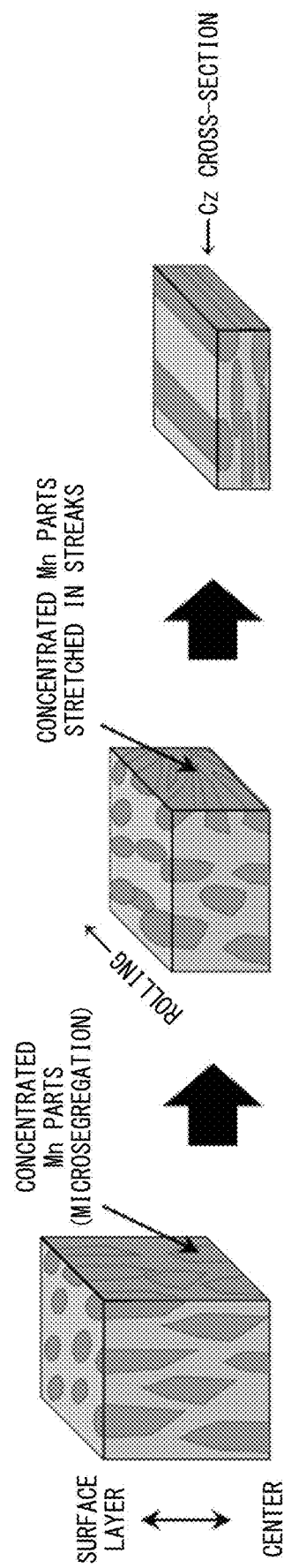
FIG. 1 is a schematic view showing the form of concentrated Mn parts at a surface of a base steel sheet.

According to the new discovery of the inventors, the plating streaking in hot dip galvannealed steel sheet is due to uneven internal oxidation at the surface layer of the base steel sheet. As shown in FIG. 1, the concentrated Mn parts of the ground iron surface of the slab after casting are stretched in the rolling direction by the rolling to form streaking. That is, if rolling a slab to obtain steel sheet, at the surface of the steel sheet, the concentrated Mn parts are stretched in streaks along the rolling direction. As shown in FIG. 2, if annealing steel sheet in such a state (FIG. 2A) for example, Mn oxides (for example, $Mn_2SiO_4$) are formed as internal oxides by selective oxidation at the concentrated Mn parts of the steel sheet surface. Due to the pinning effect of the Mn oxides, crystal grain growth at the surface layer can be suppressed (FIG. 2B). That is, in a base steel sheet, the grain boundary density easily becomes higher at the part where the internal oxides are present. After that, if the base steel sheet is formed with a galvanized layer and further is alloyed, alloying is promoted at the parts with high grain boundary density (FIG. 2C). By the plating layer growing thick, streaking occurs at the plating layer (FIG. 2D).

As explained above, the plating streaking at the hot dip galvannealed steel sheet can be said to occur due to the uneven internal oxidation at the surface layer of the base steel sheet. On the other hand, according to the new discovery of the inventors, the level of perception of the plating streaking changes depending on the difference of the extent of that uneven internal oxidation. That is, even if internal oxides were formed in the base steel sheet, if the interval between the internal oxides is sufficiently narrow or sufficiently broad, plating streaking detracting from the appearance is hard to occur. On this point, by controlling the distribution of internal oxides at the surface of the base steel sheet, it is possible to improve the plating streaking at the hot dip galvannealed steel sheet. In this way, the inventors discovered that the level of perception of the plating streaking does not depend on only the "amount" of concentrated Mn of the base steel sheet surface layer such as disclosed in the prior art (for example, PTL 3), more accurately, depends on the "distribution" of the Mn oxides as internal oxides.

The distribution of Mn oxides as internal oxides at the surface layer of the base steel sheet can be quantified by examining a cross-section of the base steel sheet. Further, the distribution of Mn oxides as internal oxides at the surface layer of the base steel sheet can, for example, be controlled by making the pickling conditions of the hot rolled steel sheet after hot rolling over-pickling, dissolving the Mn concentrated at the surface layer (interface between base steel sheet and scale), and reducing the starting points of formation of internal oxides. In this case, the interval between internal oxides becomes sufficiently broad and plating streaking detracting from the appearance becomes hard to form. In the steel sheet after hot rolling, it is believed that Mn easily concentrates at the surface layer. In this regard, it is believed that by making the pickling conditions over-pickling to dissolve and remove the steel sheet surface layer as a whole, the number of concentrated Mn parts becomes smaller at the steel sheet surface newly exposed after pickling. As a result, it is believed the number of starting points of internal oxidation becomes smaller, the pitch of internal oxides becomes broader, and occurrence of the above plating streaking is kept down.

The present invention was completed based on the above new discovery. Below, embodiments of the present invention will be explained. Note that, the explanation of these is intended to just illustrate the embodiments of the present invention. The present invention is not limited to the following embodiments.

The hot dip galvannealed steel sheet according to the present embodiment has a base steel sheet and a plating layer. The base steel sheet has a chemical composition containing, by mass %, C: 0.0005 to 0.0100%,
Si: 0.01 to 0.50%,
Mn: 0.01 to 2.00%,
P: 0.100% or less,
S: 0.0100% or less,
N: 0.0200% or less,
Ti: 0.040 to 0.180%,
Nb: 0 to 0.100%,
B: 0.0005 to 0.0100%,
Al: 0 to 1.000%,
Cu: 0 to 1.000%,
Cr: 0 to 2.000%,
Ni: 0 to 0.500%,
Mo: 0 to 3.000%,
W: 0 to 0.100%,
V: 0 to 1.000%,
O: 0 to 0.020%,
Ta: 0 to 0.100%,
Co: 0 to 3.000%,
Sn: 0 to 1.000%,
Sb: 0 to 0.500%,
As: 0 to 0.050%,
Mg: 0 to 0.050%,
Zr: 0 to 0.050%,
Ca: 0 to 0.0500%,
REM: 0 to 0.0500% and
a balance of Fe and impurities.

In the hot dip galvannealed steel sheet according to the present embodiment, an existence ratio ER of internal oxides identified by the following Condition 1 is 40% or less, and an interval I of internal oxides identified by the following Condition 2 is 300 μm or more.

Condition 1: A cross-section of the base steel sheet vertical to the rolling direction is examined and grain boundary type internal oxides contained in the cross-section are identified. Here, the field of observation is made within a range of 2 mm along the surface direction of the base steel sheet. Internal oxides present within a range of 0.5 μm or more and 5.0 μm or less in the depth direction from the surface of the base steel sheet are covered. The identified internal oxides are projected on the surface of the base steel sheet. At the surface of the base steel sheet, the ratio occupied by the internal oxides projected on the surface of the base steel sheet is identified as the "existence ratio ER" of the internal oxides.

Condition 2: A cross-section of the base steel sheet vertical to the rolling direction is examined and grain boundary type internal oxides contained in the cross-section are identified. Here, the field of observation is within a range of 2 mm along the surface direction of the base steel sheet. Internal oxides present within a range of 0.5 μm or more and 5.0 μm or less in the depth direction from the surface of the base steel sheet are covered. The identified internal oxides are projected on the surface of the base steel sheet. At the surface of the base steel sheet, the interval I of the adjacent internal oxides is identified based on the positions of the internal oxides projected on the surface of the base steel sheet.

1.1. Chemical Composition of Base Steel Sheet

First, the reasons for limiting the chemical composition of the base steel sheet will be explained. Here, the "%" of the constituents means mass %. Furthermore, in the present application, the "to" showing a numerical range, unless otherwise indicated, is used in the sense including the numerical values described before and after it as the lower limit value and upper limit value.

(C: 0.0005 to 0.0100%)

The smaller the amount of C in the base steel sheet, the more the mechanical properties such as the elongation and r-value are improved. In the present embodiment, C can be fixed by the later explained Ti or Nb, but if TiC or NbC increases too much, the dependency of the mechanical properties of the base steel sheet on the annealing temperature becomes higher and the range of annealing conditions for obtaining the desired mechanical properties is liable to become narrower. Further, in the base steel sheet, if the amount of dissolved C remaining without being fixed by the Ti or Nb is great, alloying of the plating may be impeded. On this point, the C content is 0.0100% or less and may be 0.0080% or less, 0.0060% or less, or 0.0040% or less. Further, from the viewpoint of suppressing excessive rise of the steelmaking costs, the C content is 0.0005% or more and may be 0.0010% or more, 0.0015% or more or 0.0020% or more.

(Si: 0.01 to 0.50%)

Si is an element improving the strength of the base steel sheet. On the other hand, if the base steel sheet excessively contains Si, the wettability of the plating with respect to the base steel sheet may worsen. Further, if the base steel sheet excessively includes Si, alloying of the plating becomes slower and the number of nonalloyed plating parts may be greater at the hot dip galvannealed steel sheet. On this point, the Si content is 0.50% or less and may be 0.48% or less or 0.46% or less. Further, the Si content is 0.01% or more and may be 0.05% or more, 0.10% or more, or 0.20% or more.

(Mn: 0.01 to 2.00%)

Mn is an element improving the strength of the base steel sheet. On the other hand, if the Mn content becomes excessively great, the elongation of the steel sheet is liable to fall. On this point, the Mn content is 2.00% or less and may be 1.95% or less. Further, the Mn content is 0.01% or more and may be 0.05% or more, 0.10% or more, or 0.20% or more. Further, according to the new discovery of the inventors, if the Mn content in the base steel sheet is within a specific range, plating streaking detracting from the appearance becomes harder to occur. That is, if the Mn content is small, uneven Mn concentration of an extent causing streak-like appearance defects is hard to occur. Further, if the Mn content is great, the Mn concentration rises at the surface of the base steel sheet as a whole and the above uneven Mn concentration is easily resolved. If considering the above, in the present embodiment, from the viewpoint of improving the appearance of the hot dip galvannealed steel sheet and securing the elongation, the Mn content may be 0.01 to 1.30% or 1.70 to 2.00%. The Mn content may be 0.50% or more and may be 1.20% or less. Alternatively, the Mn content may be 1.75% or more and may be 1.95% or less.

(P: 0.100% or Less)

P is an element improving the strength of the base steel sheet and may be added optionally. On the other hand, if the base steel sheet excessively contains P, the alloying of the plating becomes slower and the number of nonalloyed plating parts may be greater at the hot dip galvannealed steel sheet. On this point, the P content is 0.100% or less and may be 0.090% or less. The lower limit of the P content is not particularly prescribed. The P content is 0% or more and may be 0.001% or more.

(S: 0.0100% or Less)

S is an element segregating at the grain boundaries of the base steel sheet and causing secondary work embrittlement. Further, it is an element forming MnS and other nonmetallic inclusions in the steel and inviting a drop in ductility of the base steel sheet. The smaller the amount, the more preferable. The S content is 0% or more and may be 0.0005% or more, 0.0010% or more, or 0.0020% or more. Further, it is 0.0100% or less and may be 0.0090% or less or 0.0080% or less.

(N: 0.0200% or Less)

N is an element forming coarse nitrides in the base steel sheet and lowering the workability of the steel sheet. Further, N is an element becoming a cause of formation of blowholes at the time of welding. Further, if excessively containing N, it bonds with Ti to cause the formation of TiN and the effective amount of Ti for fixing the C is liable to fall. On this point, the N content is 0.0200% or less and may be 0.0150% or less, 0.0100% or less, 0.0080% or less, or 0.0060% or less. Further, the N content is 0% or more, but from the viewpoint of keeping down an excessive rise in the steelmaking costs, the N content may be 0.0001% or more or 0.0010% or more.

(Ti: 0.040 to 0.180%)

Ti is an element fixing C to improve the mechanical properties of elongation and the r-value of the base steel sheet. If the Ti content is 0.040% or more, such an effect is easily obtained. The Ti content may be 0.045% or more or 0.050% or more. On the other hand, if the Ti content is too great, the balance of the strength and ductility of the base steel sheet is liable to deteriorate. If the Ti content is 0.180% or less, such a problem is easily avoided. The Ti content may be 0.150% or less, 0.120% or less, or 0.100% or less.

(Nb: 0 to 0.100%)

Nb, like Ti, is an element fixing C to improve the mechanical properties of elongation and the r-value of the base steel sheet. However, the effect is weaker than Ti. As explained above, an effect of fixing the C is obtained due to Ti, so the Nb content may be 0%. The Nb content is 0% or more and may be 0.001% or more, 0.005% or more, or 0.010% or more. On the other hand, if the Nb content is too great, the dependency of the mechanical properties of the base steel sheet on the annealing temperature becomes higher and the range of annealing conditions for obtaining the desired mechanical properties is liable to become narrower. On this point, the Nb content is 0.100% or less and may be 0.060% or less or 0.040% or less.

(B: 0.0005 to 0.0100%)

B is an element for preventing secondary work embrittlement of the base steel sheet. In the present embodiment, as explained above, Ti and Nb can fix the C and remove the grain boundary C, but if removing the grain boundary C, secondary work embrittlement easily occurs. In the present embodiment, B is included instead of C in the base steel sheet so as to easily avoid such a problem. In particular, if B content is 0.0005% or more, such a problem is even more easily avoided. The B content may be 0.0007% or more or 0.0009% or more. On the other hand, if the base steel sheet excessively contains B, the alloying of the plating becomes slower and nonalloyed plating parts may increase at the hot dip galvannealed steel sheet. On this point, the B content is 0.0100% or less and may be 0.0050% or less or 0.0020% or less.

(Al: 0 to 1.000%)

Al is an element acting as a deoxidizer of steel and is added according to need. On the other hand, if excessively containing Al, the balance of strength and ductility may deteriorate. The Al content is 0% or more and may be 0.001% or more, 0.005% or more, 0.010% or more, or 0.015% or more. Further, it is 1.000% or less and may be 0.700% or less, 0.500% or less, 0.300% or less, 0.100% or less, 0.080% or less, 0.060% or less, or 0.040% or less.

The basic chemical composition of the base steel sheet in the present embodiment is as explained above. Further, the base steel sheet in the present embodiment may contain at least one of the following elements according to need. These elements need not be included, so the lower limits of the contents of the same are 0%. These elements have no substantial effect on the mechanism of the solution of the problem in the present embodiment.

(Cu: 0 to 1.000%)

Cu is an element able to contribute to improvement of at least one of the strength and corrosion resistance. On the other hand, if excessively containing Cu, deterioration of the toughness is liable to be invited. The Cu content is 0% or more and may be 0.001% or more, 0.010% or more, 0.050% or more, or 0.100% or more. Further, it is 1.000% or less and may be 0.800% or less, 0.600% or less, 0.400% or less, 0.250% or less, or 0.150% or less.

(Cr: 0 to 2.000%)

Cr is an element raising the hardenability of steel and able to contribute to improvement of at least one of strength and corrosion resistance. On the other hand, if excessively containing Cr, the alloy costs may increase and in addition the toughness may fall. The Cr content is 0% or more and may be 0.001% or more, 0.010% or more, 0.050% or more, or 0.100% or more. Further, it is 2.000% or less and may be 1.500% or less, 1.000% or less, 0.500% or less, 0.300% or less, or 0.150% or less.

(Ni: 0 to 0.500%)

Ni is an element raising the hardenability of steel and able to contribute to improvement of at least one of strength and heat resistance. On the other hand, if excessively containing Ni, the effect becomes saturated and a rise in the production costs is liable to be invited. The Ni content is 0% or more and may be 0.001% or more, 0.010% or more, 0.030% or more, or 0.050% or more. Further, it is 0.500% or less and may be 0.400% or less, 0.300% or less, 0.200% or less, or 0.100% or less.

(Mo: 0 to 3.000%)

Mo is an element raising the hardenability of steel and able to contribute to improvement of at least one of strength and corrosion resistance. On the other hand, if excessively containing Mo, the deformation resistance at the time of working is liable to increase. The Mo content is 0% or more and may be 0.001% or more, 0.005% or more, 0.010% or more, or 0.020% or more. Further, it is 3.000% or less and may be 2.000% or less, 1.000% or less, 0.500% or less, or 0.100% or less.

(W: 0 to 0.100%)

W is an element raising the hardenability of steel and able to contribute to improvement of strength. On the other hand, if excessively containing W, coarse inclusions are liable to form. The W content is 0% or more and may be 0.001% or more, 0.005% or more, or 0.010% or more. Further, it is 0.100% or less and may be 0.080% or less, 0.050% or less, or 0.030% or less (V: 0 to 1.000%)

V is an element able to contribute to improvement of strength by precipitation strengthening etc. On the other hand, if excessively containing V, a large amount of precipitates may form and the toughness may be lowered. The V content is 0% or more and may be 0.001% or more, 0.010% or more, 0.030% or more, or 0.050% or more. Further, it is 1.000% or less and may be 0.800% or less, 0.500% or less, 0.300% or less, 0.100% or less, or 0.070% or less.

(O: 0 to 0.020%)

O is an element able to enter in the production process. To lower the O content to the maximum extent, time is required in refining and a drop in productivity is invited. On the other hand, if excessively containing O, coarse inclusions may be formed and the toughness of the steel material may be lowered. The O content is 0% or more and may be 0.001% or more, 0.002% or more, or 0.003% or more. Further, it is 0.020% or less and may be 0.015% or less, 0.010% or less, or 0.005% or less.

(Ta: 0 to 0.100%)

Ta is an element able to contribute to control of the form of the carbides and increase of strength. On the other hand, if excessively containing Ta, a large number of fine Ta carbides precipitate and the toughness is liable to fall. The Ta content is 0% or more and may be 0.001% or more, 0.005% or more, 0.010% or more, or 0.020% or more. Further, it is 0.100% or less and may be 0.080% or less, 0.060% or less, or 0.040% or less.

(Co: 0 to 3.000%)

Co is an element able to contribute to improvement of at least one of hardenability and heat resistance. On the other hand, if excessively containing Co, the workability is liable to fall and an increase in material costs is led to. The Co content is 0% or more and may be 0.001% or more, 0.010% or more, 0.020% or more, or 0.050% or more. Further, it is 3.000% or less and may be 2.000% or less, 1.000% or less, 0.500% or less, 0.200% or less, or 0.100% or less.

(Sn: 0 to 1.000%)

Sn is an element able to contribute to improvement of corrosion resistance. On the other hand, if excessively containing Sn, a drop in toughness is liable to be invited. The Sn content is 0% or more and may be 0.001% or more, 0.005% or more, 0.010% or more, or 0.020% or more. Further, it is 1.000% or less and may be 0.800% or less, 0.500% or less, 0.300% or less, 0.100% or less, or 0.050% or less.

(Sb: 0 to 0.500%)

Sb is an element able to contribute to improvement of the corrosion resistance. On the other hand, if excessively containing Sb, a drop in the toughness is liable to be invited. The Sb content is 0% or more and may be 0.001% or more, 0.005% or more, or 0.010% or more. Further, it 0.500% or less and may be 0.300% or less, 0.100% or less, or 0.050% or less.

(As: 0 to 0.050%)

As is an element able to contribute to improvement of the machineability of steel. On the other hand, if excessively containing As, the workability is liable to deteriorate. The As content is 0% or more and may be 0.001% or more, 0.005% or more, or 0.010% or more. Further, it is 0.050% or less and may be 0.040% or less, 0.030% or less, or 0.020% or less.

(Mg: 0 to 0.050%)

Mg is an element able to contribute to control of the form of sulfides. On the other hand, if excessively containing Mg, the toughness is liable to decline. The Mg content is 0% or more and may be 0.001% or more, 0.003% or more, or 0.005% or more. Further, it is 0.050% or less and may be 0.030% or less, 0.020% or less, or 0.015% or less.

(Zr: 0 to 0.050%)

Zr is an element able to contribute to control of the form of sulfides. On the other hand, if excessively containing Zr, the effect will be saturated and a rise in production costs is liable to be invited. The Zr content is 0% or more and may be 0.001% or more, 0.003% or more, 0.005% or more, or 0.010% or more. Further, it is 0.050% or less and may be 0.040% or less, 0.030% or less, or 0.020% or less.

(Ca: 0 to 0.0500%)

Ca is an element able to control the form of sulfides by addition in a trace amount. On the other hand, if excessively containing Ca, the effect becomes saturated and a rise in production costs is liable to be invited. The Ca content is 0% or more and may be 0.0001% or more, 0.0005% or more, 0.0010% or more, or 0.0020% or more. Further, it is 0.0500% or less and may be 0.0300% or less, 0.0200% or less, 0.0100% or less, 0.0070% or less, or 0.0040% or less.

(REM: 0 to 0.0500%)

A REM, like Ca, is an element able control the form of sulfides in a trace amount. On the other hand, if excessively containing a REM, coarse inclusions are liable to be formed. The REM content is 0% or more and may be 0.0001% or more, 0.0005% or more, 0.0010% or more, or 0.0020% or more. Further, it is 0.0500% or less and may be 0.0300% or less, 0.0200% or less, 0.0100% or less, 0.0070% or less, or 0.0040% or less. Further, a "REM" in this Description is a general name for the 17 elements of atomic number 21 scandium (Sc), atomic number 39 yttrium (Y), and the lanthanoids of atomic number 57 lanthanum (La) to atomic number 71 lutetium (Lu). The REM content is the total content of these elements.

In the present embodiment, the balance of the chemical composition of the base steel sheet other than the constituents described above consists of Fe and impurities. "Impurities" are constituents entering due to various factors in the production process such as first and foremost the raw materials such as ore or scrap etc. when industrially producing the base steel sheet according to the present embodiment.

1.2. Condition 1 In the hot dip galvannealed steel sheet according to the present embodiment, the existence ratio ER of internal oxides identified by the above Condition 1 is 40% or less.

As shown in FIG. 3, in the Condition 1, a cross-section 10*a* of the base steel sheet 10 vertical to the rolling direction (front direction in depth of paper surface of FIG. 3) is examined and grain boundary type internal oxides 15 contained in the cross-section 10*a* are identified. Here, the field of observation is within a range of 2 mm along the surface direction of the base steel sheet 10. More specifically, the observation is conducted by a field emission scanning electron microscope (FE-SEM), the field of observation in one image is 1000×, a plurality of images are acquired along the surface direction of the base steel sheet 10, and the plurality of images are stitched together to identify the state of the cross-section within a range of 2 mm along the surface direction of the base steel sheet 10. Grain boundary type internal oxides 15 within a range of 0.5 μm or more and 5.0 μm or less in the depth direction from the surface 10*ax* of the base steel sheet 10 are covered. That is, in the present application, the "external oxides" (oxide scale etc.) present at the surface 10*ax* of the base steel sheet 10, in contrast "internal oxides" present at a depth of 0.5 μm or more from the surface 10*ax*. Further, grain boundary type internal oxides 15 are usually not formed at a depth such as more than 5.0 μm from the surface 10*ax*, so it is sufficient to just cover internal oxides at a depth of 5.0 μm or less from the surface 10*ax* in the measurement.

"Grain boundary type internal oxides" mean oxides precipitating and formed along the crystal grain boundaries of the base steel sheet. As explained above, grain boundary type internal oxides all can suppress crystal grain growth at the surface layer by the pinning effect. That is, at parts where grain boundary type internal oxides are present, the grain boundary density easily rises and alloying of the plating layer is also easily promoted.

Grain boundary type internal oxides 15 may for example include Mn and may include Si in addition to Mn. The internal oxides may for example include $Mn_2SiO_4$ and may include oxides having other compositions than that. The grain boundary type internal oxides 15 included in the field of observation can for example be easily identified as to position, size, and shape through elemental analysis etc. The observation may be performed using a known electron microscope etc.

As shown in FIG. 3, under the above Condition 1, the grain boundary type internal oxides 15 identified by the above observation of the cross-section are projected on the surface 10ax of the base steel sheet 10, then the existence ratio ER is identified. Specifically, at the surface 10ax of the base steel sheet 10, the ratio of the surface 10ax of the base steel sheet 10 occupied by the internal oxides 15 projected on the surface ([(total length L ($=L_1+L_2+\ldots$) of the internal oxides projected on the surface)/(length $L_0$ of surface as a whole-(2 mm))]×100) is identified as the existence ratio ER of the internal oxides 15. Further, as shown as $L_1$ in FIG. 3, if a plurality of internal oxides 15 are superposed over each other in the depth direction, after being projected on the surface 10ax of the base steel sheet 10, they are calculated as one internal oxide. The same is true even if identifying the interval I explained later.

If the thus identified existence ratio ER is 40% or less, there are few internal oxides 15 at the surface layer of the base steel sheet 10 and unevenness of the internal oxides 15 becomes difficult to occur. The existence ratio ER may be 38% or less or 35% or less. The lower limit of the existence ratio ER is not particularly prescribed. It may be 0%, but if envisioning annealing at a high dew point such as explained later, it may be more than 0%, may be 5% or more, may be 8% or more, and may be 10% or more.

1.3. Condition 2

In the hot dip galvannealed steel sheet according to the present embodiment, the interval I of internal oxides identified by the above Condition 2 is 300 μm or more.

As shown in FIG. 3, under the above Condition 2, a cross-section 10a of the base steel sheet 10 vertical to the rolling direction is examined and grain boundary type internal oxides 15 contained in the cross-section 10a are identified. Here, the field of observation is within a range of 2 mm along the surface direction of the base steel sheet 10. More specifically, in the same way as the Condition 1, the observation is conducted by a field emission scanning electron microscope (FE-SEM), the field of observation in one image is 1000×, a plurality of images are acquired along the surface direction of the base steel sheet 10, and the plurality of images are stitched together to identify the state of the cross-section within a range of 2 mm along the surface direction of the base steel sheet 10. Grain boundary type internal oxides 15 within a range of 0.5 μm or more and 5.0 μm or less in the depth direction from the surface 10ax of the base steel sheet 10 are covered. The grain boundary type internal oxides 15 are identified in the same way as the above Condition 1.

As shown in FIG. 3, in the above Condition 2, the grain boundary type internal oxides 15 identified by the above observation of the cross-section are projected on the surface 10ax of the base steel sheet 10, then the interval I is identified. Specifically, at the surface of the base steel sheet 10, the interval I of adjacent internal oxides 15 is identified based on the positions of the internal oxides 15 projected on the surface of the base steel sheet 10.

If the interval I identified in this way is 300 μm or more, at the surface layer of the base steel sheet 10, the interval at which the internal oxides are present at the surface layer is sufficiently broad, the interval of parts with a high grain boundary density is also sufficiently broad, and, as a result, even when forming a hot dip galvannealed layer, plating streaking detracting from the appearance is difficult to occur. The interval I may also be 350 μm or more and may be 400 μm or more. The upper limit of the interval I is not particularly prescribed. As explained above, the field of observation under the Condition 2 is within a range of 2 mm along the surface direction of the base steel sheet 10, but the interval I may also be more than 2 mm and may also be 2 mm or less, 1 mm or less, 800 μm or less, or 600 μm or less. Further, if a plurality of intervals I are identified in one field, it is sufficient that the smallest interval I be 300 μm or more. For example, as shown in FIG. 3, if $I_1$ and $I_2$ are identified as intervals I, it is sufficient that the shorter of these, $I_1$, be 300 μm or more.

Further, in the present application, the "rolling direction" of the base steel sheet can be identified by the orientation of the streaks formed at the base steel sheet. For example, as shown in FIG. 1, the rolling direction can be identified based on the stretched direction of the concentrated Mn parts. The stretched direction of the concentrated Mn parts in the base steel sheet may also be identified by for example element mapping utilizing the EPMA.

1.4. Microstructure

The microstructure of the base steel sheet is not particularly limited and can be adjusted in accordance with the performance sought from the base steel sheet. In the present embodiment, the microstructure of the base steel sheet may be, by area ratio, for example ferrite: 94 to 100%, martensite and bainite in total: 0 to 4%, and retained austenite: 0 to 2%. The phases and the area ratios of the microstructure can be identified for example as follows:

The area ratio of the retained austenite is evaluated by high resolution crystal structure analysis using the EBSD method (electron backscattered diffraction method). Specifically, a cross-section parallel to the rolling direction and sheet thickness direction of the base steel sheet is made the observed surface to take a sample. The observed surface is polished to a mirror finish. Furthermore, electrolytic polishing or mechanical polishing using colloidal silica is performed for removing the worked layer of the surface layer. Next, at the ¼ thickness position, five fields, each field being 10000 μm- or more, are analyzed for crystal structure by the EBSD method. Further, the distance between evaluation points (step) is 0.01 to 0.20 μm. The data obtained by the EBSD method is analyzed using analysis software (for example, "OIM Analysis" made by TSL). From the results of examination of these positions, regions judged as FCC iron are judged to be retained austenite and the area ratio of retained austenite is calculated.

The area ratios of the ferrite, martensite, bainite, and pearlite are measured in the following way. First, a sample is taken using a cross-section of the base steel sheet parallel to the rolling direction and thickness direction as the observed section. The observed section is polished and etched by Nital. Next, in a range of ⅛ thickness to ⅜ thickness centered about a position of ¼ thickness from the surface, a total of five fields, each field being 1200 μm² or more, are examined by a field emission scanning electron microscope (FE-SEM). Further, the area ratios of ferrite, bainite, martensite, and pearlite were respectively measured. Here, the structures are identified in the following way. A region in which cementite precipitates in a lamellar state is judged to be pearlite. A region with a relatively low brightness is judged to be ferrite. The respective area ratios are calculated by the point counting method. After that, the area ratio of other regions minus the area ratio of retained austenite obtained by the EBSD method in advance is deemed the area ratio of martensite and bainite in total.

1.5. Plating Layer

The hot dip galvannealed steel sheet according to the present embodiment has the above base steel sheet and plating layer. The plating layer is formed on at least one surface of the base steel sheet. The plating layer may be a hot dip galvannealed layer having a composition known to persons skilled in the art. For example, the plating layer may contain Al and other added elements besides Zn. In the hot dip galvannealed steel sheet according to the present embodiment, the chemical composition of the plating layer may be, for example, by mass %, Fe: 5 to 25%, Al: 0 to 1.0%, Si: 0 to 1.0%, Mg: 0 to 1.0%, Mn: 0 to 1.0%, Ni: 0 to 1.0%, Sb: 0 to 1.0%, and a balance: Zn and impurities. The Al content at the plating layer may be more than 0 mass % or 0.1 mass % or more. The amount of deposition of the plating layer is not particularly limited, but may be a general amount of deposition.

The chemical composition of the plating layer can for example be identified by the following procedure. That is, a coating remover not eating away at the plating (for example, Neo River SP-751 made by Sansaikako) is used to remove the surface layer coating, then hydrochloric acid containing an inhibitor (for example, Hibiron made by Sugimura Chemical Industrial Co., Ltd.) is used to dissolve the plating layer. The obtained solution can be supplied for inductively coupled plasma (ICP) emission spectrometry to find the chemical composition of the plating layer.

1.6. Other Properties of Hot Dip Galvannealed Steel Sheet

The hot dip galvannealed steel sheet in the present embodiment need only be one with a base steel sheet having the above chemical composition and satisfying the requirements of the existence ratio ER and interval I. Further, in the present embodiment, the hot dip galvannealed steel sheet may further have the following properties.

(Tensile Strength TS)

To lighten the weight of structural members using steel as their base materials and to improve the resistance of the structural members in plastic deformation, the steel material preferably has a large work hardening ability and exhibits maximum strength. On the other hand, if the tensile strength of the steel sheet is too large, fracture becomes easier to occur by low energy during plastic deformation and the shapeability may fall. The tensile strength of the hot dip galvannealed steel sheet may for example be 430 MPa or more, 450 MPa or more, 500 MPa or more, or 520 MPa or more and, further, may be 600 MPa or less, 580 MPa or less, 550 MPa or less, or 500 MPa or less.

(Total Elongation EL)

When shaping steel sheet cold to produce a structural member, to finish it into a complicated shape, the steel sheet requires elongation. If the total elongation of the steel sheet is too low; the material may break in the cold shaping. The total elongation of the steel sheet is not particularly limited, but for example may be 25% or more or 30% or more and, further, may be 40% or less or 35% or less.

(Yield Point YP)

In the present embodiment, the yield point of the steel sheet is not particularly limited, but for example may be 195 MPa or more, 200 MPa or more, 210 MPa or more, 250 MPa or more, 280 MPa or more, or 300 MPa or more and, further, may be 420 MPa or less, 400 MPa or less, 380 MPa or less, 350 MPa or less, 340 MPa or less, or 320 MPa or less.

(Methods of Measurement of Tensile Strength, Total Elongation, and Yield Point)

The tensile test for measuring the tensile strength, total elongation, and yield point is based on JIS Z 2241. A JIS No. 5 test piece is taken from a direction in which the long direction of the test piece becomes parallel to the direction perpendicular to rolling of the steel strip.

(Sheet Thickness)

The thickness of the base steel sheet is a factor having an impact on the rigidity of the steel member after shaping. The greater the sheet thickness, the higher the rigidity of the member. If the sheet thickness is too small, a drop in the rigidity is invited and the press formability may fall due to the effect of unavoidable nonferrous inclusions present inside the steel sheet. On the other hand, if the sheet thickness is too great, the press-forming load increases and die wear or a drop in productivity may be invited. The thickness of the base steel sheet is not particularly limited, but may be 0.2 mm or more and may be 6.0 mm or less.

1.7. Effects

As explained above, the hot dip galvannealed steel sheet according to the present embodiment has a distribution of internal oxides at the surface layer of the base steel sheet controlled to a predetermined state. Due to this, even if the plating layer is formed thick, due to the mechanism shown in FIGS. 1 and 2, alloying of plating is promoted at parts where internal oxides are present (parts high in grain boundary density), the interval between parts where the plating layer is formed thick is sufficiently broad, so plating streaking is not readily observed. As a result, the hot dip galvannealed steel sheet according to the present embodiment is excellent in plating appearance and appearance after coating.

2. Method of Production of Hot Dip Galvannealed Steel Sheet

The hot dip galvannealed steel sheet according to the present embodiment can be produced by integrated control of continuous casting, hot rolling, cold rolling, and annealing. In particular, it is important to make the pickling conditions after hot rolling over-pickling and make the steel sheet surface layer dissolve. Due to this, the number of starting points of formation of internal oxides is reduced and the above existence ratio ER and interval I become easier to satisfy. Alternatively, it is also possible to make the dew point at the time of annealing a low dew point so as to suppress the formation of internal oxides. Below, one example of the method of production of the hot dip galvannealed steel sheet will be explained, but the method of production of the hot dip galvannealed steel sheet is not limited to the following example. For example, the method of production of the hot dip galvannealed steel sheet according to the present embodiment includes obtaining a steel slab having the above chemical composition by continuous casting, heating the steel slab then hot rolling it to obtain hot rolled steel sheet, coiling the hot rolled steel sheet, dipping the hot rolled steel sheet in a pickling solution to pickle it, cold rolling the hot rolled steel sheet to obtain cold rolled steel sheet, and
annealing the cold rolled steel sheet, wherein
the pickling solution includes hydrochloric acid, a concentration of hydrochloric acid in the pickling solution is 7 mass % or more, a temperature of the pickling solution is 80° C. or more, and a dipping time in the pickling solution is 30 seconds or more, and
a dew point in the atmosphere at the time of annealing is −35° C. or more and 30° ° C. or less. Below; the steps will be explained in detail focusing on the parts becoming points in the present embodiments.

2.1. Pickling Conditions

In the method of production of the hot dip galvannealed steel sheet according to the present embodiment, the conditions when dipping the hot rolled sheet in a pickling solution to pickle it are important. That is, by setting conditions enabling not only scale on the sheet surface, but also Mn at the surface layer of the sheet to be dissolved (conditions resulting in over-pickling more than usual), it is possible to dissolve the Mn concentrated at the sheet surface layer and reduce the starting points of formation of internal oxides. As a result, the above existence ratio ER and interval I become easier to satisfy. Specifically, in the present embodiment, the pickling solution includes hydrochloric acid. The concentration of hydrochloric acid in the pickling solution should be 7 mass % or more. In this way, by using a pickling solution containing hydrochloric acid in a high concentration, it becomes easy to make not only the scale at the surface of the hot rolled sheet, but also the Mn of the surface layer of the hot rolled sheet dissolve. The concentration of hydrochloric acid at the pickling solution may be 9 mass % or more and may be 15 mass % or less. Further, the temperature of the pickling solution should be 80° C. or more. In this way, by making the temperature of the pickling solution a high temperature, it becomes easy to make not only the scale at the surface of the hot rolled sheet, but also the Mn of the surface layer of the hot rolled sheet dissolve. The temperature of the pickling solution may be 85° C. or more and may be 90° C. or less. Furthermore, the dipping time in the pickling solution may be 30 seconds or more. In this way, by making the dipping time in the pickling solution a long time, it becomes easy to make not only the scale at the surface of the hot 20) rolled sheet, but also the Mn of the surface layer of the hot rolled sheet dissolve. The dipping time may be 35 seconds or more and may be 60 seconds or less.

2.2. Annealing Conditions

When forming the hot dip galvannealed layer, from the viewpoint of raising the alloying speed etc., most often it is best to make internal oxides form at the surface layer of the sheet. In this way, to make internal oxides form at part of the surface layer of the sheet in a range satisfying the above existence ratio ER while satisfying the interval I, as explained above, it is sufficient to perform pickling under conditions resulting in over-pickling so as to make the scale and Mn at the sheet surface dissolve and reduce starting points of formation internal oxides, then cold roll the steel sheet, anneal it in a high dew point atmosphere after cold rolling, make internal oxides form at part of the surface layer of the sheet, and form a hot dip galvannealed layer during the annealing or after the annealing. For example, the dew point in the annealing atmosphere may be −35° C. or more, −30° C. or more, −25° C. or more, or −20° ° C. or more and may be 30° C. or less. 25° C. or less. 20° C. or less. 15° C. or less, or 0° C. or less. Further, by making the atmosphere at the time of annealing a low dew point atmosphere, formation of internal oxides at the surface layer of the sheet is suppressed and the above existence ratio ER can be achieved. However, if the atmosphere at the time of annealing is a less than −35° C. low dew point atmosphere, external oxides will easily form at the surface most part of the base steel sheet. Specifically, external oxides of Si or Mn are formed at the surface most part of the base steel sheet. Due to the external oxides, the plating is repelled resulting in nonplating parts being formed, diffusion of Fe is impeded and alloying becomes slower, and there is the concern that the targeted hot dip galvannealed steel sheet will not be obtained.

2.3. Other Steps

In the method of production according to the present embodiment, as explained above, continuous casting, hot rolling, coiling, pickling, cold rolling, annealing, etc. may be performed. The pickling conditions and the atmosphere at the time of annealing are as explained above. The hot rolling conditions, coiling conditions, cold rolling conditions, and annealing conditions other than the atmosphere are not particularly limited. Further, the conditions of the plating are also not particularly limited. Below, examples of the steps will be shown.

(Hot Rolling Conditions)

When hot rolling a slab, the slab may be heated before the hot rolling. The heating temperature is not particularly limited, but for example may be 1100° ° C. or more and 1300° C. or less. The heating time is not particularly limited and for example may be 30 minutes or more and 300 minutes or less. Further, when hot rolling a slab after heating, general conditions may be employed for the rough rolling conditions and the finish rolling conditions. However, the finish rolling temperature of the hot rolling is a factor having an effect on control of the texture of the base steel sheet, so it should be controlled to a predetermined temperature range. For example, the finish rolling temperature of the hot rolling may be 900° C. or more and may be 950° C. or less.

(Coiling Conditions)

The coiling temperature of the hot rolled steel sheet is not particularly limited. For example, it may be 500° C. or more and 800° ° C. or less.

(Rolling Reduction in Cold Rolling)

The rolling reduction in cold rolling is important from the viewpoint of obtaining a texture excellent in r-value. For example, the total of the rolling reduction in the cold rolling is desirably 70% or more and desirably 90% or less. For the purpose of lowering the cold rolling load at the time of cold rolling, the annealing may be performed at a temperature of 700° C. or less.

(Annealing Holding Temperature)

If the heating temperature at the time of annealing is too low, the ductility of the steel sheet will easily fall. On the other hand, excessively high temperature heating not only invites a rise in costs, but also causes trouble such as inferior sheet shape at the time of high temperature running or reduced lifetime of the rolls. From the above viewpoints, the highest heating temperature at the time of annealing (annealing holding temperature) is preferably 750° C. or more and preferably 900° C. or less.

(Annealing Holding Time)

At the time of annealing, the steel sheet is preferably held at the above heating temperature for 5 seconds or more. If the holding time is too short, the drop in strength may be remarkable. Further, the variation in hardness may easily become greater. From these viewpoints, the holding time is more preferably 10 seconds or more. More preferably it is 20 seconds or more.
(Cooling Rate After Annealing)

The cooling conditions after the annealing are not particularly limited.
(Cooling Stop Temperature and Reheating After Annealing)

Further, after cooling after annealing, next, if the cooling stop temperature is lower than the plating bath temperature, the steel sheet may be reheated to the temperature region of 350° C. to 600° C. Further, if the cooling stop temperature is excessively low, not only does a large capital investment become necessary, but also the effect becomes saturated.
(Dwell Temperature)

Furthermore, after reheating and before dipping in the plating bath, the steel sheet may be made to dwell at the temperature region of 350 to 600° C. This dwelling operation at this temperature region suppresses uneven temperature of the sheet in the width direction and improves the appearance after plating. If the cooling stop temperature after annealing was 350° ° C. to 600° C., the dwelling may be performed without reheating.
(Dwell Time)

The dwell time is desirably 30 seconds or more or 300 seconds or less for obtaining the above effect.
(Tempering)

In the series of annealing steps, the cold rolled steel sheet or the steel sheet comprised of the cold rolled sheet plated may be reheated after being cooled down to room temperature or in the middle of cooling down to room temperature (however, Ms or less).
(Plating)

The surface of the steel sheet is formed with a hot dip galvanized layer by a hot dip galvanization step. In this case, the corrosion resistance of the cold rolled steel sheet is improved, so this is preferred. In the method of production according to the present embodiment, the surface of the sheet may be formed with a plating layer in the annealing. Alternatively, the surface of the sheet after annealing may be formed with the plating layer.
(Composition of Plating Bath)

The plating bath is comprised mainly of Zn. It is sufficient that the chemical composition of the plating layer after alloying can become the targeted range. The plating bath preferably has an effective amount of Al (value of total amount of Al in plating bath minus total amount of Fe) of 0.050 to 0.250 mass %. If the effective amount of Al in the plating bath is too small, Fe excessively penetrates the plating layer and the plating adhesion is liable to fall. On the other hand, if the effective amount of Al in the plating bath is too great, at the boundary of the steel sheet and the plating layer, Al-based oxides impeding movement of Fe atoms and Zn atoms will be formed and the alloying is liable to be unable to sufficiently proceed. The effective amount of Al in the plating bath is more preferably 0.065 mass % or more, more preferably 0.180 mass % or less.
(Steel Sheet Temperature After Entry into Plating Bath)

To alloy the hot dip galvanized layer, it is sufficient to heat the steel sheet on which the hot dip galvanized layer is formed to the temperature range of 450 to 600° C. If the alloying temperature is too low, the alloying is liable to not sufficiently proceed. On the other hand, if the alloying temperature is too high, the alloying will proceed too much and due to the formation of a Γ phase, the concentration of Fe in the plating layer will become excessive and the plating adhesion is liable to drop. The alloying temperature may be 470° C. or more and may be 580° C. or less. The alloying temperature has to be changed according to the chemical composition of the steel sheet, the degree of formation of internal oxides, etc., so the concentration of Fe in the plating layer should be confirmed while setting it. The alloying of the hot dip galvanized layer is for example performed in an alloying furnace and soaking zone. The dwell times in the alloying furnace and soaking zone may be for example 10 seconds or so in the alloying furnace and 20 seconds or so in the soaking zone and a total of 30 seconds or so. The "soaking zone" is a section for soaking so that the temperature of the steel sheet exiting from the alloying furnace does not rapidly fall.
(Post Treatment)

The surface of the hot dip galvannealed steel sheet can be treated for the purpose of improving the coatability and weldability by forming an upper layer plating or treating it in various ways such as chromate treatment, phosphate treatment, improvement of lubrication, improvement of weldability, etc.
(Skin Pass Rolling Rate)

Furthermore, skin pass rolling may be performed for the purpose of correction of the shape of the steel sheet or improving the ductility by introduction of movable dislocations. The rolling reduction of the skin pass rolling after heat treatment is preferably 0.1 to 1.5% in range. If less than 0.1%, the effect becomes small and control is difficult. This becomes the lower limit. If more than 1.5%, the productivity remarkably falls, so this is made the upper limit. The skin pass may be performed in-line or may be performed off line. Further, the skin pass at the target rolling reduction may be performed just once or may be performed divided into a plurality of operations.

EXAMPLES

Below, examples according to the present invention will be shown. The present invention is not limited to these examples of conditions. The present invention can employ various conditions so long as not departing from its gist and achieving its object.

1. Preparation of Base Steel Sheet

Steels having various chemical compositions were smelted and continuously cast to produce steel slabs. After cooling, each steel slab was inserted into a furnace heated to 1200° ° C. and held there for 90 minutes to homogenize it, then was taken out into the atmosphere. After that, it was hot rolled to obtain a thickness 3.2 mm hot rolled steel sheet which was then coiled up at a predetermined temperature. After that, this oxide scale on the hot rolled steel sheet was removed by pickling. The pickling conditions were made to change to adjust the amount of dissolution and removal of scale and concentrated Mn at the sheet surface layer. After pickling, the steel sheet was cold rolled (rolling reduction 75%) to finish it into a sheet thickness 0.8 mm cold rolled steel sheet. Furthermore, the cold rolled steel sheet was annealed. In all of the steel sheets, the holding temperature at the time of annealing was 800° C. and the holding time was 60 seconds. The atmosphere while holding the steel sheets was $N_2$-4% $H_2$ and the dew point was made 0° C. or −40° C. After annealing, each sheet was immediately plated and alloyed, then was rolled by skin pass rolling. The chemical compositions of the base steel sheets obtained by analyzing samples taken from the obtained steel sheets are as shown in the following Tables 1 and 2. Note that, the balances other than the constituents shown in Tables 1 and 2 are Fe and impurities.

TABLE 1

| | Constituents (%) | | | | | | | | | | | | |
|---|---|---|---|---|---|---|---|---|---|---|---|---|---|
| No. | C | Si | Mn | P | S | N | Ti | Nb | B | Al | Cu | Cr | Ni |
| 1 | 0.0021 | 0.30 | 1.16 | 0.072 | 0.0067 | 0.0023 | 0.100 | 0.021 | 0.0010 | 0.036 | — | — | — |
| 2 | 0.0026 | 0.34 | 1.93 | 0.080 | 0.0072 | 0.0025 | 0.100 | — | 0.0010 | 0.058 | — | — | — |
| 3 | 0.0024 | 0.34 | 1.61 | 0.068 | 0.0068 | 0.0020 | 0.100 | 0.026 | 0.0010 | 0.041 | — | — | — |
| 4 | 0.0021 | 0.30 | 1.16 | 0.072 | 0.0067 | 0.0023 | 0.100 | 0.021 | 0.0010 | 0.036 | 0.010 | — | — |
| 5 | 0.0018 | 0.31 | 1.15 | 0.071 | 0.0065 | 0.0020 | 0.100 | 0.006 | 0.0010 | 0.036 | — | 0.020 | — |
| 6 | 0.0018 | 0.31 | 1.15 | 0.071 | 0.0065 | 0.0020 | 0.100 | 0.006 | 0.0010 | 0.036 | — | — | 0.030 |
| 7 | 0.0028 | 0.31 | 1.14 | 0.072 | 0.0076 | 0.0020 | 0.053 | 0.020 | 0.0009 | 0.036 | — | — | — |
| 8 | 0.0022 | 0.31 | 1.10 | 0.084 | 0.0060 | 0.0028 | 0.100 | 0.027 | 0.0090 | 0.036 | 0.810 | — | — |
| 9 | 0.0095 | 0.23 | 1.14 | 0.074 | 0.0065 | 0.0025 | 0.100 | 0.023 | 0.0030 | 0.071 | — | 1.950 | — |
| 10 | 0.0053 | 0.05 | 1.02 | 0.093 | 0.0002 | 0.0055 | 0.100 | 0.093 | 0.0075 | 0.762 | — | — | 0.489 |
| 11 | 0.0023 | 0.49 | 0.54 | 0.077 | 0.0003 | 0.0020 | 0.090 | 0.042 | 0.0060 | 0.975 | — | — | — |
| 12 | 0.0059 | 0.15 | 1.17 | 0.076 | 0.0048 | 0.0024 | 0.050 | 0.087 | 0.0010 | 0.120 | — | — | — |
| 13 | 0.0059 | 0.45 | 1.24 | 0.042 | 0.0008 | 0.0024 | 0.050 | 0.084 | 0.0005 | 0.245 | — | — | — |
| 14 | 0.0023 | 0.15 | 1.01 | 0.082 | 0.0094 | 0.0044 | 0.060 | 0.026 | 0.0030 | 0.370 | — | — | — |
| 15 | 0.0034 | 0.05 | 1.05 | 0.091 | 0.0076 | 0.0037 | 0.050 | 0.092 | 0.0010 | 0.325 | — | — | — |
| 16 | 0.0033 | 0.27 | 0.44 | 0.095 | 0.0095 | 0.0025 | 0.095 | 0.005 | 0.0010 | 0.047 | — | — | — |
| 17 | 0.0046 | 0.23 | 0.82 | 0.087 | 0.0098 | 0.0029 | 0.060 | 0.026 | 0.0010 | 0.341 | — | — | — |
| 18 | 0.0032 | 0.31 | 0.43 | 0.094 | 0.0073 | 0.0027 | 0.080 | 0.025 | 0.0010 | 0.578 | — | — | — |
| 19 | 0.0046 | 0.13 | 1.12 | 0.083 | 0.0088 | 0.0030 | 0.070 | 0.035 | 0.0030 | 0.717 | — | — | — |
| 20 | 0.0012 | 0.24 | 0.53 | 0.092 | 0.0077 | 0.0033 | 0.050 | 0.086 | 0.0010 | 0.250 | — | — | — |
| 21 | 0.0027 | 0.11 | 1.26 | 0.084 | 0.0039 | 0.0032 | 0.070 | 0.034 | 0.0060 | 0.178 | — | — | — |
| 22 | 0.0047 | 0.47 | 1.24 | 0.043 | 0.0025 | 0.0021 | 0.043 | 0.013 | 0.0015 | 0.943 | — | — | — |
| 23 | 0.0056 | 0.13 | 1.22 | 0.077 | 0.0086 | 0.0024 | 0.062 | 0.087 | 0.0010 | 0.312 | — | — | — |
| 24 | 0.0023 | 0.48 | 1.96 | 0.092 | 0.0024 | 0.0198 | 0.104 | 0.001 | 0.0040 | 0.848 | 0.128 | 0.151 | 0.337 |
| 25 | 0.0020 | 0.48 | 1.28 | 0.100 | 0.0044 | 0.0019 | 0.100 | 0.021 | 0.0005 | 0.027 | 0.020 | 0.010 | 0.012 |
| 26 | 0.0022 | 0.47 | 1.95 | 0.090 | 0.0049 | 0.0018 | 0.100 | 0.020 | 0.0010 | 0.034 | 0.014 | 0.012 | 0.017 |
| 27 | 0.0028 | 0.31 | 1.14 | 0.072 | 0.0076 | 0.0020 | 0.053 | 0.020 | 0.0009 | 0.036 | — | — | — |
| 28 | 0.0092 | 0.34 | 1.14 | 0.074 | 0.0098 | 0.0054 | 0.105 | 0.024 | 0.0020 | 0.395 | — | — | — |
| 29 | 0.0047 | 0.15 | 1.08 | 0.081 | 0.0087 | 0.0037 | 0.055 | 0.035 | 0.0030 | 0.714 | — | — | — |
| 30 | 0.0020 | 0.48 | 1.28 | 0.100 | 0.0044 | 0.0019 | 0.100 | 0.021 | 0.0005 | 0.027 | 0.020 | 0.010 | 0.012 |
| 31 | 0.0022 | 0.47 | 1.95 | 0.090 | 0.0049 | 0.0018 | 0.100 | 0.020 | 0.0010 | 0.034 | 0.014 | 0.012 | 0.017 |
| 32 | 0.0024 | 0.16 | 1.03 | 0.084 | 0.0099 | 0.0047 | 0.050 | 0.029 | 0.0020 | 0.354 | — | — | — |
| 33 | 0.0150 | 0.31 | 1.13 | 0.072 | 0.0077 | 0.0022 | 0.100 | 0.021 | 0.0009 | 0.035 | 0.017 | 0.016 | 0.014 |
| 34 | 0.0022 | 0.70 | 1.95 | 0.090 | 0.0049 | 0.0018 | 0.100 | 0.020 | 0.0010 | 0.034 | 0.019 | 0.016 | 0.016 |
| 35 | 0.0022 | 0.47 | 2.50 | 0.090 | 0.0049 | 0.0018 | 0.100 | 0.020 | 0.0010 | 0.034 | 0.015 | 0.018 | 0.012 |
| 36 | 0.0023 | 0.30 | 1.15 | 0.125 | 0.0072 | 0.0024 | 0.100 | 0.021 | 0.0010 | 0.036 | 0.011 | 0.016 | 0.018 |
| 37 | 0.0022 | 0.47 | 1.95 | 0.090 | 0.0160 | 0.0018 | 0.100 | 0.020 | 0.0010 | 0.034 | 0.015 | 0.013 | 0.017 |
| 38 | 0.0022 | 0.46 | 1.90 | 0.090 | 0.0049 | 0.0018 | 0.030 | 0.020 | 0.0010 | 0.034 | 0.017 | 0.011 | 0.015 |
| 39 | 0.0021 | 0.30 | 1.16 | 0.072 | 0.0067 | 0.0023 | 0.100 | 0.021 | 0.0002 | 0.036 | 0.019 | 0.020 | 0.015 |
| 40 | 0.0022 | 0.47 | 1.95 | 0.090 | 0.0049 | 0.0018 | 0.100 | 0.020 | 0.0120 | 0.034 | 0.012 | 0.012 | 0.013 |
| 41 | 0.0029 | 0.46 | 1.94 | 0.098 | 0.0046 | 0.0017 | 0.209 | 0.028 | 0.0010 | 0.033 | 0.011 | 0.022 | 0.019 |

TABLE 2

| | Constituent (%) | | | | | | | | | | | | |
|---|---|---|---|---|---|---|---|---|---|---|---|---|---|
| No. | Mo | W | V | O | Ta | Co | Sn | Sb | As | Mg | Zr | Ca | REM |
| 1 | — | — | — | — | — | — | — | — | — | — | — | — | — |
| 2 | — | — | — | — | — | — | — | — | — | — | — | — | — |
| 3 | — | — | — | — | — | — | — | — | — | — | — | — | — |
| 4 | — | — | — | — | — | — | — | — | — | — | — | — | — |
| 5 | — | — | — | — | — | — | — | — | — | — | — | — | — |
| 6 | — | — | — | — | — | — | — | — | — | — | — | — | — |
| 7 | 0.010 | — | — | — | — | — | — | — | — | — | — | — | — |
| 8 | — | — | — | — | — | — | — | — | — | — | — | — | — |
| 9 | — | — | — | — | — | — | — | — | — | — | — | — | — |
| 10 | — | — | — | — | — | — | — | — | — | — | — | — | — |
| 11 | 2.870 | — | — | — | — | — | — | — | — | — | — | — | — |
| 12 | — | 0.093 | — | — | — | — | — | — | — | — | — | — | — |
| 13 | — | — | 0.901 | — | — | — | — | — | — | — | — | — | — |
| 14 | — | — | — | 0.018 | — | — | — | — | — | — | — | — | — |
| 15 | — | — | — | — | 0.085 | — | — | — | — | — | — | — | — |
| 16 | — | — | — | — | — | 2.770 | — | — | — | — | — | — | — |
| 17 | — | — | — | — | — | — | 0.710 | — | — | — | — | — | — |
| 18 | — | — | — | — | — | — | — | 0.430 | — | — | — | — | — |
| 19 | — | — | — | — | — | — | — | — | 0.037 | — | — | — | — |
| 20 | — | — | — | — | — | — | — | — | — | 0.045 | — | — | — |
| 21 | — | — | — | — | — | — | — | — | — | — | 0.047 | — | — |
| 22 | — | — | — | — | — | — | — | — | — | — | — | 0.0479 | — |
| 23 | — | — | — | — | — | — | — | — | — | — | — | — | 0.0488 |
| 24 | 0.570 | 0.037 | 0.270 | 0.003 | 0.025 | 0.260 | 0.310 | 0.170 | 0.034 | 0.021 | 0.021 | 0.0271 | 0.0380 |

TABLE 2-continued

| | Constituent (%) | | | | | | | | | | | | |
|---|---|---|---|---|---|---|---|---|---|---|---|---|---|
| No. | Mo | W | V | O | Ta | Co | Sn | Sb | As | Mg | Zr | Ca | REM |
| 25 | — | — | — | — | — | — | — | — | — | — | — | — | — |
| 26 | — | — | — | — | — | — | — | — | — | — | — | — | — |
| 27 | 0.010 | — | — | — | — | — | — | — | — | — | — | — | — |
| 28 | — | — | — | — | — | — | — | — | — | — | — | — | — |
| 29 | — | — | — | — | — | — | — | — | — | — | — | — | — |
| 30 | — | — | — | — | — | — | — | — | — | — | — | — | — |
| 31 | — | — | — | — | — | — | — | — | — | — | — | — | — |
| 32 | — | — | — | — | — | — | — | — | — | — | — | — | — |
| 33 | — | — | — | — | — | — | — | — | — | — | — | — | — |
| 34 | — | — | — | — | — | — | — | — | — | — | — | — | — |
| 35 | — | — | — | — | — | — | — | — | — | — | — | — | — |
| 36 | — | — | — | — | — | — | — | — | — | — | — | — | — |
| 37 | — | — | — | — | — | — | — | — | — | — | — | — | — |
| 38 | — | — | — | — | — | — | — | — | — | — | — | — | — |
| 39 | — | — | — | — | — | — | — | — | — | — | — | — | — |
| 40 | — | — | — | — | — | — | — | — | — | — | — | — | — |
| 41 | — | — | — | — | — | — | — | — | — | — | — | — | — |

2. Plating

Each steel sheet was hot dip galvanized, then alloyed. In the hot dip galvanization step, the steel sheet was dipped in a 450° ° C. hot dip galvanization bath for 5 seconds. After that, it was alloyed at 590° ° C. and was cooled from the alloying temperature down to room temperature to obtain hot dip galvannealed steel sheet. The plating of the base steel sheet can be performed by the same equipment and line as the annealing.

3. Evaluation 3.1. Observation of Grain Boundary Type Internal Oxides at Base Steel Sheet In the hot dip galvannealed steel sheet, a cross-section in a direction perpendicular to the rolling direction was observed and, as shown in FIG. 3, the existence ratio ER of internal oxides identified by the following Condition 1 and the interval 1 of internal oxides identified by the following Condition 2 were identified.

Condition 1: As shown in FIG. 3, a cross-section of the base steel sheet vertical to the rolling direction was examined and grain boundary type internal oxides contained in the cross-section were identified. Here, the field of observation was within a range of 2 mm along the surface direction of the base steel sheet. More specifically, the observation was conducted by a field emission scanning electron microscope (FE-SEM), the field of observation in one image was 1000×, a plurality of images were acquired along the surface direction of the base steel sheet 10, and the plurality of images were stitched together to identify the state of the cross-section within a range of 2 mm along the surface direction of the base steel sheet 10. Internal oxides present within a range of 0.5 μm or more and 5.0 μm or less in the depth direction from the surface of the base steel sheet were covered. The identified internal oxides were projected on the surface of the base steel sheet. At the surface of the base steel sheet, the ratio occupied by the internal oxides projected on the surface of the base steel sheet was identified as the "existence ratio ER" of the internal oxides.

Condition 2: As shown in FIG. 3, a cross-section of the base steel sheet vertical to the rolling direction was examined and grain boundary type internal oxides contained in the cross-section were identified. Here, the field of observation was within a range of 2 mm along the surface direction of the base steel sheet. More specifically, in the same way as Condition 1, the observation was conducted by a field emission scanning electron microscope (FE-SEM), the field of observation in one image was 1000×, a plurality of images were acquired along the surface direction of the base steel sheet 10, and the plurality of images were stitched together to identify the state of the cross-section within a range of 2 mm along the surface direction of the base steel sheet 10. Internal oxides present within a range of 0.5 μm or more and 5.0 μm or less in the depth direction from the surface of the base steel sheet were covered. The identified internal oxides were projected on the surface of the base steel sheet. At the surface of the base steel sheet, the interval I of the adjacent oxides was identified based on the positions of the internal oxides projected on the surface of the base steel sheet.

3.2. Mechanical Properties

The yield point (YP), tensile strength (TS), total elongation (EL), and average r-value of the hot dip galvannealed steel sheet were measured. The measurement conditions were as explained above.

3.3. Plateability 3.3.1. Wettability

The wettability of the plating at the time of plating the base steel sheet was evaluated by the following criteria:
  Good: Wettability good (in visual observation, 100% of surface of base steel sheet deemed to be plated)
  Poor: Wettability poor (in visual observation, parts of surface of base steel sheet deemed not to be plated)

3.3.2. Occurrence of Plating Streaking

The appearance of the hot dip galvannealed steel sheet was visually observed and the degree of perception of plating streaking was evaluated in accordance with the following evaluation criteria:
  Very good: No plating streaking can be visually confirmed.
  Good: No plating streaking can be visually confirmed at position 50 cm from steel sheet.
  Fair: Plating streaking can be visually confirmed at position 50 cm from steel sheet, but no plating streaking can be visually confirmed at position 100 cm away.
  Poor: Plating streaking can be visually confirmed even at position 100 cm away from steel sheet.

3.4. Shapeability/Workability 3.4.1. Adhesion of Plating on Die

The hot dip galvannealed steel sheet was press-formed (condition: cylindrical deep drawing) and evaluated for the presence of adhesion of the plating to the die by the following criteria:
  Good: Almost no adhesion of plating to die
  Poor: Much adhesion of plating to die 3.4.2. Secondary Work Embrittlement The hot dip galvannealed steel sheet was cylindrically deep drawn and was cooled at 0° C. for 5 minutes or more, then was crushed by a press and evaluated for any secondary work embrittlement by the following criteria:

Good: No secondary work embrittlement (crack length after pressing less than 10 mm)

Poor: Secondary work embrittlement embrittlement (crack length after pressing less than 10 mm or more)

4. Results

Table 3 shows the production condition of the base steel sheet, the properties of the hot dip galvannealed steel sheet, the mechanical properties, and the results of evaluation of the plateability and the shape/workability.

TABLE 3

| No. | Heating temp. of slab before hot rolling [°C] | Heating time of slab before hot rolling [min] | Hot rolling finish temp. [°C] | Coiling temp. [°C] | HCl conc. of pickling solution [%] | Temp. of pickling solution [°C] | Dipping time at pickling [s] | Annealing dew point [°C] | Annealing temp [°C] | Internal oxides Existence ratio ER [%] | Internal oxides Interval I [μm] | YP | TS | EL | Wettability | Streaking | Adhesion of plating at die | Secondary work embrittlement | Remarks |
|---|---|---|---|---|---|---|---|---|---|---|---|---|---|---|---|---|---|---|---|
| 1 | 1200 | 90 | 920 | 700 | 15 | 85 | 60 | 0 | 800 | 0 | >2000 | 241 | 462 | 36 | Good | Very good | Good | Good | Ex. |
| 2 | 1200 | 90 | 920 | 700 | 15 | 85 | 60 | 0 | 800 | 35 | 800 | 238 | 511 | 27 | Good | Very good | Good | Good | Ex. |
| 3 | 1200 | 90 | 920 | 700 | 15 | 85 | 60 | 0 | 800 | 30 | 400 | 259 | 482 | 31 | Good | Good | Good | Good | Ex. |
| 4 | 1200 | 90 | 920 | 700 | 10 | 80 | 30 | 0 | 800 | 35 | 350 | 210 | 460 | 36 | Good | Good | Good | Good | Ex. |
| 5 | 1200 | 90 | 920 | 700 | 10 | 85 | 45 | 0 | 800 | 10 | 500 | 237 | 453 | 37 | Good | Very good | Good | Good | Ex. |
| 6 | 1200 | 90 | 920 | 700 | 10 | 80 | 30 | 0 | 800 | 35 | 400 | 230 | 462 | 35 | Good | Good | Good | Good | Ex. |
| 7 | 1200 | 90 | 920 | 700 | 10 | 85 | 30 | 0 | 800 | 15 | 550 | 263 | 454 | 35 | Good | Very good | Good | Good | Ex. |
| 8 | 1200 | 90 | 920 | 700 | 10 | 80 | 30 | 0 | 800 | 20 | 500 | 200 | 466 | 34 | Good | Very good | Good | Good | Ex. |
| 9 | 1200 | 90 | 920 | 700 | 10 | 85 | 30 | 0 | 800 | 30 | 350 | 222 | 459 | 32 | Good | Good | Good | Good | Ex. |
| 10 | 1200 | 90 | 920 | 700 | 10 | 80 | 30 | 0 | 800 | 25 | 400 | 203 | 432 | 34 | Good | Good | Good | Good | Ex. |
| 11 | 1200 | 90 | 920 | 700 | 10 | 85 | 30 | 0 | 800 | 20 | 600 | 210 | 473 | 29 | Good | Very good | Good | Good | Ex. |
| 12 | 1200 | 90 | 920 | 700 | 10 | 80 | 30 | 0 | 800 | 30 | 300 | 205 | 453 | 32 | Good | Good | Good | Good | Ex. |
| 13 | 1200 | 90 | 920 | 700 | 10 | 85 | 30 | 0 | 800 | 15 | 500 | 218 | 450 | 33 | Good | Very good | Good | Good | Ex. |
| 14 | 1200 | 90 | 920 | 700 | 10 | 80 | 30 | 0 | 800 | 10 | 550 | 205 | 455 | 33 | Good | Very good | Good | Good | Ex. |
| 15 | 1200 | 90 | 920 | 700 | 10 | 85 | 30 | 0 | 800 | 25 | 350 | 234 | 451 | 32 | Good | Good | Good | Good | Ex. |
| 16 | 1200 | 90 | 920 | 700 | 10 | 80 | 30 | 0 | 800 | 35 | 350 | 231 | 451 | 30 | Good | Good | Good | Good | Ex. |
| 17 | 1200 | 90 | 920 | 700 | 10 | 85 | 30 | 0 | 800 | 15 | 350 | 236 | 456 | 33 | Good | Very good | Good | Good | Ex. |
| 18 | 1200 | 90 | 920 | 700 | 10 | 80 | 30 | 0 | 800 | 20 | 300 | 207 | 449 | 32 | Good | Good | Good | Good | Ex. |
| 19 | 1200 | 90 | 920 | 700 | 10 | 85 | 30 | 0 | 800 | 30 | 400 | 209 | 446 | 33 | Good | Good | Good | Good | Ex. |
| 20 | 1200 | 90 | 920 | 700 | 10 | 80 | 30 | 0 | 800 | 35 | 400 | 205 | 443 | 32 | Good | Good | Good | Good | Ex. |
| 21 | 1200 | 90 | 920 | 700 | 10 | 85 | 30 | 0 | 800 | 25 | 350 | 233 | 454 | 34 | Good | Good | Good | Good | Ex. |
| 22 | 1200 | 90 | 920 | 700 | 10 | 80 | 30 | 0 | 800 | 10 | 400 | 242 | 462 | 33 | Good | Very good | Good | Good | Ex. |
| 23 | 1200 | 90 | 920 | 700 | 10 | 85 | 30 | 0 | 800 | 25 | 300 | 203 | 451 | 32 | Good | Good | Good | Good | Ex. |
| 24 | 1200 | 90 | 920 | 700 | 10 | 80 | 30 | 0 | 800 | 30 | 350 | 370 | 530 | 31 | Good | Good | Good | Good | Ex. |
| 25 | 1200 | 90 | 920 | 700 | 7 | 80 | 35 | 0 | 800 | 25 | 350 | 358 | 507 | 30 | Good | Good | Good | Good | Ex. |
| 26 | 1200 | 90 | 920 | 700 | 10 | 90 | 30 | 0 | 800 | 15 | 450 | 372 | 532 | 28 | Good | Very good | Good | Good | Ex. |

TABLE 3-continued

| | | | Production conditions | | | | | | | Internal oxides | | Mechanical properties | | | Plating/appearance | | Shape/workability | | |
|---|---|---|---|---|---|---|---|---|---|---|---|---|---|---|---|---|---|---|---|
| | Heating temp. of slab before hot rolling | Heating time of slab before hot rolling | Hot rolling finish temp. | Coiling temp. | HCl conc. of pickling solution | Temp. of pickling solution | Dipping time at pickling | Annealing dew point | Annealing temp | Existence ratio ER | Interval I | YP | TS | EL | Wettability | Streaking | Adhesion of plating at die | Secondary work embrittlement | Remarks |
| No. | [° C.] | [min] | [° C.] | [° C.] | [%] | [° C.] | [s] | [° C.] | [° C.] | [%] | [μm] | | | | | | | | |
| 27 | 1200 | 90 | 920 | 700 | 10 | 65 | 25 | 0 | 800 | 45 | 300 | 263 | 454 | 35 | Good | Fair | Good | Good | Comp. ex. |
| 28 | 1200 | 90 | 920 | 700 | 10 | 65 | 30 | 0 | 800 | 50 | 300 | 192 | 450 | 30 | Good | Fair | Good | Good | Comp. ex. |
| 29 | 1200 | 90 | 920 | 700 | 10 | 80 | 15 | 0 | 800 | 45 | 350 | 211 | 450 | 33 | Good | Fair | Good | Good | Comp. ex. |
| 30 | 1200 | 90 | 920 | 700 | 10 | 65 | 15 | 0 | 800 | 60 | 200 | 358 | 507 | 30 | Good | Fair | Good | Good | Comp. ex. |
| 31 | 1200 | 90 | 920 | 700 | 5 | 80 | 35 | 0 | 800 | 50 | 250 | 372 | 532 | 28 | Good | Poor | Good | Good | Comp. ex. |
| 32 | 1200 | 90 | 920 | 700 | 10 | 85 | 30 | −40 | 800 | 0 | >2000 | 203 | 460 | 33 | Poor | Very good | Poor | Good | Comp. ex. |
| 33 | 1200 | 90 | 920 | 700 | 15 | 85 | 60 | 0 | 800 | 5 | >2000 | 309 | 451 | 38 | Good | Very good | Poor | Good | Comp. ex. |
| 34 | 1200 | 90 | 920 | 700 | 10 | 80 | 30 | 0 | 800 | 30 | 350 | 394 | 554 | 27 | Poor | Very good | Poor | Good | Comp. ex. |
| 35 | 1200 | 90 | 920 | 700 | 10 | 85 | 45 | 0 | 800 | 15 | 600 | 392 | 560 | 24 | Good | Good | Good | Good | Comp. ex. |
| 36 | 1200 | 90 | 920 | 700 | 10 | 80 | 30 | 0 | 800 | 35 | 400 | 255 | 501 | 36 | Good | Very good | Poor | Good | Comp. ex. |
| 37 | 1200 | 90 | 920 | 700 | 10 | 85 | 30 | 0 | 800 | 20 | 500 | 369 | 529 | 28 | Good | Good | Good | Poor | Comp. ex. |
| 38 | 1200 | 90 | 920 | 700 | 7 | 80 | 35 | 0 | 800 | 30 | 350 | 367 | 527 | 30 | Good | Good | Good | Good | Comp. ex. |
| 39 | 1200 | 90 | 920 | 700 | 10 | 90 | 30 | 0 | 800 | 10 | 400 | 240 | 461 | 30 | Good | Very good | Good | Poor | Comp. ex. |
| 40 | 1200 | 90 | 920 | 700 | 10 | 65 | 25 | 0 | 800 | 50 | 250 | 372 | 532 | 28 | Good | Fair | Poor | Good | Comp. ex. |
| 41 | 1200 | 90 | 920 | 700 | 10 | 80 | 30 | 0 | 800 | 30 | 400 | 381 | 420 | 37 | Good | Good | Good | Good | Comp. ex. |

Note that, the hot dip galvannealed steel sheets according to Nos. 1 to 41 all had microstructures of the base steel sheets satisfying, by area ratio, ferrite: 94 to 100%, martensite and bainite in total: 0 to 4%, and retained austenite: 0 to 2%. Further, the hot dip galvannealed steel sheet according to Nos. 1 to 41 all had chemical compositions of the plating layers satisfying, by mass %, Fe: 5 to 25%, Al: 0 to 1.0%, Si: 0 to 1.0%, Mg: 0 to 1.0%, Mn: 0 to 1.0%, Ni: 0 to 1.0%, Sb: 0 to 1.0%, and a balance: Zn and impurities.

From the results shown in Table 3, the following will be understood:

Regarding No. 27, the temperature of the pickling solution was low and further the dipping time at the time of pickling was too short, so it was not possible to make the surface layer of the base steel sheet suitably dissolve and as a result in the base steel after annealing, the existence ratio ER of internal oxides became greater and clear streaking occurred at the hot dip galvannealed layer.

Regarding No. 28, the temperature of the pickling solution was too low, so the surface layer of the base steel sheet could not be suitably made to dissolve and as a result at the base steel sheet after annealing, the existence ratio ER of internal oxides became greater and clear streaking occurred at the hot dip galvannealed layer.

Regarding No. 29, the dipping time at the time of pickling was too short, so the surface layer of the base steel sheet could not be suitably made to dissolve and as a result at the base steel sheet after annealing, the existence ratio ER of internal oxides became greater and clear streaking occurred at the hot dip galvannealed layer.

Regarding No. 30, the dipping time at the time of pickling was further shorter than No. 28, so the surface layer of the base steel sheet could not be suitably made to dissolve and as a result at the base steel sheet after annealing, the existence ratio ER of internal oxides became greater and clear streaking occurred at the hot dip galvannealed layer.

Regarding No. 31, the concentration of hydrochloric acid in the pickling solution was too low, so the surface layer of the base steel sheet could not be suitably made to dissolve at the time of pickling and as a result at the base steel sheet after annealing, the existence ratio ER of internal oxides became greater, the interval I of internal oxides became smaller, and clear streaking occurred at the hot dip galvannealed layer Regarding No. 32, the dew point at the time of annealing was too low, so an external oxide layer was formed at the surface of the base steel sheet, the plating was repelled at the time of plating resulting in formation of nonplating parts, and the targeted hot dip galvannealed steel sheet could not be obtained.

Regarding No. 33, the C content at the base steel sheet was too great, so at the base steel sheet, it is believed the amount of dissolved C remaining without being fixed by the Ti and Nb became great. As a result, alloying of the plating was impeded and at the plated steel sheet, nonalloyed plating parts formed and adhesion of the plating to the die became easier to occur.

Regarding No. 34, the Si content at the base steel sheet was too great, so it is believed that the wettability of the plating on the base steel sheet deteriorated. Further, it is believed that due to the Si, alloying of the plating was impeded. As a result, the number of nonalloyed plating parts at the plated steel sheet increased and, at the time of press-forming, the nonalloyed plating parts adhered to the die and the shapeability and productivity were detracted from.

Regarding No. 35, the Mn content at the base steel sheet was too great, so the elongation tended to fall.

Regarding No. 36, the P content at the base steel sheet was too great, so it is believed alloying of the plating was impeded. As a result, nonalloyed plating parts increased at the plated steel sheet and, at the time of press-forming, the nonalloyed plating parts adhered to the die detracting from the shapeability and productivity.

Regarding No. 37, the S content at the base steel sheet was too great, so secondary work embrittlement occurred due to segregation at the grain boundaries of the base steel sheet.

Regarding No. 38, the Ti content at the base steel sheet was too small, so it is believed that the C was insufficiently fixed at the base steel sheet and alloying of the plating was impeded by the dissolved C. As a result, nonalloyed plating parts formed at the plated steel sheet and adhesion of the plating at the die easily occurred.

Regarding No. 39, the B content at the base steel sheet was too small, so the function of C removed from the grain boundaries could not be sufficiently complemented and secondary work embrittlement occurred.

Regarding No. 40, the B content at the base steel sheet was too great, so it is believed that alloying of the plating was impeded. As a result, nonalloyed plating parts increased at the plated steel sheet and, at the time of press-forming, the nonalloyed plating parts adhered to the die detracting from the shapeability and productivity. Further, the temperature of the pickling solution was low and, further, the dipping time at the time of pickling was too short, so it was not possible to suitably make the surface layer of the base steel sheet dissolve and as a result, in the base steel sheet after annealing, the existence ratio ER of internal oxides becomes greater, the interval I of internal oxides becomes smaller, and clear streaking occurred at the hot dip galvannealed layer.

Regarding No. 41, the Ti content in the base steel sheet was too great, so the plated steel sheet was inferior in the balance of strength and ductility.

Summarizing the above results, the following hot dip galvannealed steel sheet can be said to be resistant to plating streaking and excellent in appearance.

Hot dip galvannealed steel sheet, having a base steel sheet and a plating layer, wherein
the base steel sheet has a chemical composition containing, by mass %,
C: 0.0005 to 0.0100%,
Si: 0.01 to 0.50%,
Mn: 0.01 to 2.00%,
P: 0.100% or less,
S: 0.0100% or less,
N: 0.0200% or less,
Ti: 0.040 to 0.180%,
Nb: 0 to 0.100%,
B: 0.0005 to 0.0100%,
Al: 0 to 1.000%,
Cu: 0 to 1.000%,
Cr: 0 to 2.000%,
Ni: 0 to 0.500%,
Mo: 0 to 3.000%,
W: 0 to 0.100%,
V: 0 to 1.000%,
O: 0 to 0.020%,
Ta: 0 to 0.100%,
Co: 0 to 3.000%,
Sn: 0 to 1.000%,
Sb: 0 to 0.500%,
As: 0 to 0.050%,
Mg: 0 to 0.050%, Zr. 0 to 0.050%,
Ca: 0 to 0.0500%,
REM: 0 to 0.0500% and
a balance of Fe and impurities,
an existence ratio ER of internal oxides identified by the above Condition 1 is 40% or less, and
an interval I of internal oxides identified by the above Condition 2 is 300 µm or more.

The invention claimed is:

1. A hot dip galvannealed steel sheet, having a base steel sheet and a plating layer, wherein
the base steel sheet has a chemical composition containing, by mass %,
C: 0.0005 to 0.0100%,
Si: 0.01 to 0.50%,
Mn: 0.43 to 2.00%,
P: 0.100% or less,
S: 0.0100% or less,
N: 0.0200% or less,
Ti: 0.040 to 0.180%,
Nb: 0 to 0.100%,
B: 0.0005 to 0.0100%,
Al: 0 to 1.000%,
Cu: 0 to 1.000%,
Cr: 0 to 2.000%,
Ni: 0 to 0.500%,
Mo: 0 to 3.000%,
W: 0 to 0.100%,
V: 0 to 1.000%,
O: 0 to 0.020%,
Ta: 0 to 0.100%,
Co: 0 to 3.000%,
Sn: 0 to 1.000%,
Sb: 0 to 0.500%,
As: 0 to 0.050%,
Mg: 0 to 0.050%,
Zr: 0 to 0.050%,
Ca: 0 to 0.0500%,
REM: 0 to 0.0500% and
a balance of Fe and impurities,
wherein:
in a field of observation within a range of 2 mm along a surface direction of the base steel sheet, a cross-section of the base steel sheet vertical to a rolling direction is examined, grain boundary type internal oxides contained in the cross-section within a range of 0.5 µm or more and 5.0 µm or less in a depth direction from a surface of the base steel sheet are identified, and the identified internal oxides are projected on the surface of the base steel sheet,
a ratio occupied by the internal oxides projected on the surface of the base steel sheet is identified as an "existence ratio ER" of the internal oxides,
an interval I of adjacent internal oxides is identified based on positions of the internal oxides projected on the surface of the base steel sheet,
the existence ratio ER of internal oxides is 40% or less, and
the interval I of internal oxides is 300 µm or more.

2. The hot dip galvannealed steel sheet according to claim 1, wherein
the chemical composition contains, by mass %,
Mn: 0.43 to 1.30% or 1.70 to 2.00%.

3. The hot dip galvannealed steel sheet according to claim 1, wherein
the existence ratio ER of the internal oxides is 5% or more and 40% or less.

4. The hot dip galvannealed steel sheet according to claim 1, wherein
the chemical composition contains by mass % at least one element selected from:
Nb: 0.001 to 0.100%,
Al: 0.001 to 1.000%,
Cu: 0.001 to 1.000%,
Cr: 0.001 to 2.000%,
Ni: 0.001 to 0.500%,
Mo: 0.001 to 3.000%,
W: 0.001 to 0.100%,
V: 0.001 to 1.000%,
O: 0.001 to 0.020%,
Ta: 0.001 to 0.100%,
Co: 0.001 to 3.000%,
Sn: 0.001 to 1.000%,
Sb: 0.001 to 0.500%,
As: 0.001 to 0.050%,
Mg: 0.001 to 0.050%,
Zr: 0.001 to 0.050%,
Ca: 0.0001 to 0.0500%, and
REM: 0.0001 to 0.0500%.

5. The hot dip galvannealed steel sheet according to claim 1, wherein
the microstructure of the base steel sheet is, by area ratio:
ferrite: 94 to 100%,
martensite and bainite in total: 0 to 4%, and
retained austenite: 0 to 2%.

6. The hot dip galvannealed steel sheet according to claim 1, wherein
the chemical composition of the plating layer contains, by mass %,
Fe: 5 to 25%,
Al: 0 to 1.0%,
Si: 0 to 1.0%,
Mg: 0 to 1.0%,
Mn: 0 to 1.0%,
Ni: 0 to 1.0%,
Sb: 0 to 1.0%, and
balance: Zn and impurities.

7. The hot dip galvannealed steel sheet according to claim 2, wherein
the existence ratio ER of the internal oxides is 5% or more and 40% or less.

8. The hot dip galvannealed steel sheet according to claim 2, wherein
the chemical composition contains by mass % at least one element selected from:
Nb: 0.001 to 0.100%,
Al: 0.001 to 1.000%,
Cu: 0.001 to 1.000%,
Cr: 0.001 to 2.000%,
Ni: 0.001 to 0.500%,
Mo: 0.001 to 3.000%,
W: 0.001 to 0.100%,
V: 0.001 to 1.000%,
O: 0.001 to 0.020%,
Ta: 0.001 to 0.100%,
Co: 0.001 to 3.000%,
Sn: 0.001 to 1.000%,
Sb: 0.001 to 0.500%,
As: 0.001 to 0.050%,
Mg: 0.001 to 0.050%,
Zr: 0.001 to 0.050%,
Ca: 0.0001 to 0.0500%, and
REM: 0.0001 to 0.0500%.

9. The hot dip galvannealed steel sheet according to claim 3, wherein
the chemical composition contains by mass % at least one element selected from:
Nb: 0.001 to 0.100%,
Al: 0.001 to 1.000%,
Cu: 0.001 to 1.000%,
Cr: 0.001 to 2.000%,
Ni: 0.001 to 0.500%,
Mo: 0.001 to 3.000%,
W: 0.001 to 0.100%,
V: 0.001 to 1.000%,
O: 0.001 to 0.020%,
Ta: 0.001 to 0.100%,
Co: 0.001 to 3.000%,
Sn: 0.001 to 1.000%,
Sb: 0.001 to 0.500%,
As: 0.001 to 0.050%,
Mg: 0.001 to 0.050%,
Zr: 0.001 to 0.050%,
Ca: 0.0001 to 0.0500%, and
REM: 0.0001 to 0.0500%.

10. The hot dip galvannealed steel sheet according to claim 2, wherein
the microstructure of the base steel sheet is, by area ratio:
ferrite: 94 to 100%,
martensite and bainite in total: 0 to 4%, and
retained austenite: 0 to 2%.

11. The hot dip galvannealed steel sheet according to claim 3, wherein
the microstructure of the base steel sheet is, by area ratio:
ferrite: 94 to 100%,
martensite and bainite in total: 0 to 4%, and
retained austenite: 0 to 2%.

12. The hot dip galvannealed steel sheet according to claim 4, wherein
the microstructure of the base steel sheet is, by area ratio:
ferrite: 94 to 100%,
martensite and bainite in total: 0 to 4%, and
retained austenite: 0 to 2%.

13. The hot dip galvannealed steel sheet according to claim 2, wherein
the chemical composition of the plating layer contains, by mass %,
Fe: 5 to 25%,
Al: 0 to 1.0%,
Si: 0 to 1.0%,
Mg: 0 to 1.0%,
Mn: 0 to 1.0%,
Ni: 0 to 1.0%,
Sb: 0 to 1.0%, and
balance: Zn and impurities.

14. The hot dip galvannealed steel sheet according to claim 3, wherein
the chemical composition of the plating layer contains, by mass %,
Fe: 5 to 25%,
Al: 0 to 1.0%,
Si: 0 to 1.0%,
Mg: 0 to 1.0%,
Mn: 0 to 1.0%,
Ni: 0 to 1.0%,
Sb: 0 to 1.0%, and
balance: Zn and impurities.

15. The hot dip galvannealed steel sheet according to claim 4, wherein
the chemical composition of the plating layer contains, by mass %,
Fe: 5 to 25%,
Al: 0 to 1.0%,
Si: 0 to 1.0%,
Mg: 0 to 1.0%,
Mn: 0 to 1.0%,
Ni: 0 to 1.0%,
Sb: 0 to 1.0%, and
balance: Zn and impurities.

16. The hot dip galvannealed steel sheet according to claim 5, wherein
the chemical composition of the plating layer contains, by mass %,
Fe: 5 to 25%,
Al: 0 to 1.0%,
Si: 0 to 1.0%,
Mg: 0 to 1.0%,
Mn: 0 to 1.0%,
Ni: 0 to 1.0%,
Sb: 0 to 1.0%, and
balance: Zn and impurities.

* * * * *